United States Patent
Hasegawa et al.

(10) Patent No.: US 11,122,223 B2
(45) Date of Patent: Sep. 14, 2021

(54) IMAGING ELEMENT, IMAGING APPARATUS, IMAGE DATA PROCESSING METHOD, AND PROGRAM

(71) Applicant: FUJIFILM CORPORATION, Tokyo (JP)

(72) Inventors: Ryo Hasegawa, Saitama (JP); Tomoyuki Kawai, Saitama (JP); Hitoshi Sakurabu, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/176,176

(22) Filed: Feb. 15, 2021

(65) Prior Publication Data

US 2021/0168308 A1    Jun. 3, 2021

Related U.S. Application Data

(63) Continuation of application No. PCT/JP2019/025648, filed on Jun. 27, 2019.

(30) Foreign Application Priority Data

Aug. 31, 2018 (JP) .............................. JP2018-163998

(51) Int. Cl.
*H04N 5/3745* (2011.01)
*H04N 5/345* (2011.01)
(Continued)

(52) U.S. Cl.
CPC ............... *H04N 5/343* (2013.01); *G06T 7/20* (2013.01); *H04N 5/3456* (2013.01);
(Continued)

(58) Field of Classification Search
None
See application file for complete search history.

(56) References Cited

U.S. PATENT DOCUMENTS

| 2010/0060752 A1 | 3/2010 | Tokuyama |
| 2012/0133791 A1 | 5/2012 | Tokuyama |

(Continued)

FOREIGN PATENT DOCUMENTS

| JP | 2007-195050 A | 8/2007 |
| JP | 2011-146847 A | 7/2011 |

(Continued)

OTHER PUBLICATIONS

International Search Report issued in International Application No. PCT/JP2019/025648 dated Sep. 10, 2019.

(Continued)

*Primary Examiner* — Mark T Monk
(74) *Attorney, Agent, or Firm* — Solaris Intellectual Property Group, PLLC

(57) ABSTRACT

An imaging element includes a reading circuit, a memory that is capable of storing read captured image data, and an output circuit that outputs output image data based on the captured image data to an outside, in which the reading circuit reads out the captured image data using a first reading method or a second reading method having a smaller read data amount than the first reading method, in a case of the first reading method, a first frame rate corresponds to a second frame rate, in a case of the second reading method, the first frame rate is a frame rate lower than in the case of the first reading method, and the first and second reading methods are switched in accordance with a motion of a subject.

16 Claims, 9 Drawing Sheets

(51) Int. Cl.
*H04N 5/343* (2011.01)
*H04N 5/378* (2011.01)
*H04N 5/369* (2011.01)
*H04N 5/351* (2011.01)
*G06T 7/20* (2017.01)

(52) U.S. Cl.
CPC ............ *H04N 5/351* (2013.01); *H04N 5/378* (2013.01); *H04N 5/379* (2018.08); *H04N 5/37452* (2013.01)

(56) References Cited

U.S. PATENT DOCUMENTS

2014/0186006 A1    7/2014   Jin
2015/0066840 A1*   3/2015   Koyama ............. G06F 16/5838
                                                             707/603

FOREIGN PATENT DOCUMENTS

| JP | 2012-50141 A | 3/2012 |
| JP | 2014-82731 A | 5/2014 |
| JP | 2017-183952 A | 10/2017 |
| JP | 2017-188760 A | 10/2017 |

OTHER PUBLICATIONS

Written Opinion of the ISA issued in International Application No. PCT/JP2019/025648 dated Sep. 10, 2019.

* cited by examiner

IMAGING ELEMENT, IMAGING APPARATUS, IMAGE DATA PROCESSING METHOD, AND PROGRAM

CROSS-REFERENCE TO RELATED APPLICATIONS

This application is a continuation application of International Application No. PCT/JP2019/025648, filed Jun. 27, 2019, the disclosure of which is incorporated herein by reference in its entirety. Further, this application claims priority from Japanese Patent Application No. 2018-163998 filed Aug. 31, 2018, the disclosure of which is incorporated herein by reference in its entirety.

BACKGROUND

1. Technical Field

The technology of the present disclosure relates to an imaging element, an imaging apparatus, an image data processing method, and a program.

2. Related Art

JP2017-188760A discloses a laminated imaging element in which a memory substrate and a signal processing substrate are laminated. The memory substrate includes a memory such as a dynamic random access memory (DRAM) that temporarily stores a pixel signal output by a pixel substrate. The signal processing substrate executes various types of signal processing on the pixel signal stored in the memory substrate. In the laminated imaging element disclosed in JP2017-188760A, in a case where a moving object is detected in the pixel signal by an analysis portion included in the signal processing substrate, signal processing is executed by a signal processing portion included in the signal processing substrate.

JP2017-183952A discloses an imaging apparatus comprising an imaging element and a second image processing portion. In the imaging apparatus disclosed in JP2017-183952A, the imaging element includes an imaging portion in which a pixel for imaging is formed, and a first image processing portion that processes image data acquired by the imaging portion. In addition, the second image processing portion is electrically connected to the first image processing portion.

In the imaging apparatus disclosed in JP2017-183952A, the first image processing portion comprises a subject detection portion that performs subject detection using image data acquired at a frame rate higher than a frame rate in the second image processing portion, and detection information detected by the subject detection portion is transmitted to the second image processing portion. In addition, the first image processing portion includes a control unit that acquires the detection information detected by the subject detection portion and changes a frame rate in a case of performing subsequent subject detection. Furthermore, the subject detection portion outputs the detection information indicating an amount of motion of the subject to the control unit, and the control unit sets the frame rate relatively lower in a case where the amount of motion of the subject is small than in a case where the amount of motion of the subject is large.

SUMMARY

One embodiment of the present invention provides an imaging element, an imaging apparatus, an image data processing method, and a program capable of reducing power consumption, compared to a case where only a frame rate of reading of image data by a reading portion is changed.

A first aspect of the technology of the present disclosure is an imaging element comprising a reading portion that reads out, from a photoelectric conversion element, captured image data obtained by imaging a subject by the photoelectric conversion element and is incorporated in the imaging element, a storage portion that is capable of storing the captured image data read out from the photoelectric conversion element by the reading portion and is incorporated in the imaging element, and an output portion that outputs output image data based on the captured image data stored in the storage portion to an outside of the imaging element and is incorporated in the imaging element, in which the output portion outputs the output image data to the outside at a first frame rate, the reading portion reads out the captured image data from the photoelectric conversion element at a second frame rate, the reading portion reads out the captured image data from the photoelectric conversion element using a first reading method or a second reading method having a smaller read data amount than the first reading method, in a case of the first reading method, the first frame rate is a frame rate corresponding to the second frame rate, in a case of the second reading method, the first frame rate is a frame rate lower than in the case of the first reading method, and the first reading method and the second reading method are switched in accordance with a detection result of a detection portion that detects a motion of the subject.

Accordingly, the imaging element of the first aspect according to the technology of the present disclosure can reduce power consumption, compared to a case where only a frame rate of reading out image data by the reading portion is changed.

A second aspect according to the technology of the present disclosure is the imaging element according to the first aspect, in which the storage portion is capable of storing the captured image data in a plurality of frames adjacent in imaging timing.

Accordingly, the imaging element of the second aspect according to the technology of the present disclosure can implement more types of image processing than in a case where a plurality of pieces of captured image data of the same frame are stored in the storage portion.

A third aspect of the technology of the present disclosure is the imaging element according to the second aspect, in which the detection portion detects the motion of the subject based on the captured image data of the plurality of frames stored in the storage portion.

Accordingly, the imaging element of the third aspect according to the technology of the present disclosure can implement high accuracy detection of the motion of the subject by the detection portion, compared to a case where a plurality of pieces of the captured image data of the same frame are stored in the storage portion.

A fourth aspect according to the technology of the present disclosure is the imaging element according to any one aspect of the first aspect to the third aspect, in which the first frame rate is changed in accordance with switching between the first reading method and the second reading method.

Accordingly, the imaging element of the fourth aspect according to the technology of the present disclosure can reduce power consumption required for outputting the output image data, compared to a case where the same frame rate as the second frame rate is used at all times as the first frame rate.

A fifth aspect according to the technology of the present disclosure is the imaging element according to any one aspect of the first aspect to the fourth aspect, in which the second frame rate is fixed regardless of switching between the first reading method and the second reading method.

Accordingly, the imaging element of the fifth aspect according to the technology of the present disclosure can stabilize a time period required for processing inside the imaging element, compared to a case where the second frame rate is changed in accordance with switching between the first reading method and the second reading method.

A sixth aspect according to the technology of the present disclosure is the imaging element according to any one aspect of the first aspect to the fifth aspect, in which in the second reading method, one frame of the captured image data is a thinned image frame in which pixels are thinned out compared to a case where the subject is imaged by the photoelectric conversion element under a predetermined imaging condition.

Accordingly, the imaging element of the sixth aspect according to the technology of the present disclosure can reduce power consumption, compared to a case where one frame of the captured image data is a frame in which the pixels are not thinned out.

A seventh aspect according to the technology of the present disclosure is the imaging element according to any one aspect of the first aspect to the fifth aspect, in which in a case where the captured image data is read out by the reading portion using the second reading method, the captured image data is a plurality of thinned image frames in which pixels are thinned out compared to a case where the subject is imaged by the photoelectric conversion element under a predetermined imaging condition, and in which the pixels at different locations are thinned out, and the output image data is image data obtained by combining the plurality of thinned image frames.

Accordingly, the imaging element of the seventh aspect according to the technology of the present disclosure can implement high image quality using the output image data, compared to a case where a single thinned image frame is output as the output image data.

An eighth aspect according to the technology of the present disclosure is the imaging element according to the sixth aspect or the seventh aspect, in which in the second reading method, the subject is imaged by the photoelectric conversion element in a state where the pixels are thinned out.

Accordingly, the imaging element of the eighth aspect according to the technology of the present disclosure can reduce power consumption required for imaging by the photoelectric conversion element, compared to a case where the subject is imaged by the photoelectric conversion element in a state where the pixels are not thinned out.

A ninth aspect according to the technology of the present disclosure is the imaging element according to the sixth aspect or the seventh aspect, in which in the second reading method, the reading portion reads out the captured image data from the photoelectric conversion element in a state where the pixels are thinned out.

Accordingly, the imaging element of the ninth aspect according to the technology of the present disclosure can reduce power consumption required for reading out the captured image data by the reading portion, compared to a case where the captured image data in which the pixels are not thinned out is read out by the reading portion.

A tenth aspect according to the technology of the present disclosure is the imaging element according to any one aspect of the first aspect to the ninth aspect, in which in the second reading method, the captured image data is a plurality of pieces of thinned image data obtained by thinning out pixels at different locations for each frame, the storage portion stores the plurality of pieces of thinned image data, and the detection portion detects the motion of the subject based on the plurality of pieces of thinned image data stored in the storage portion.

Accordingly, the imaging element of the tenth aspect according to the technology of the present disclosure can detect the motion of the subject more quickly than in a case where the captured image data of one frame in which the pixels are not thinned out is stored in the storage portion in the same period as a period in which the plurality of pieces of thinned image data are stored in the storage portion.

An eleventh aspect according to the technology of the present disclosure is the imaging element according to any one aspect of the first aspect to the tenth aspect, in which the first reading method is used in a case where the motion of the subject is detected by the detection portion, and the second reading method is used in a case where the motion of the subject is not detected by the detection portion.

Accordingly, the imaging element of the eleventh aspect according to the technology of the present disclosure can reduce power consumption, compared to a case where the first reading method is employed at all times regardless of the motion of the subject.

A twelfth aspect according to the technology of the present disclosure is the imaging element according to any one aspect of the first aspect to the eleventh aspect, further comprising the detection portion. Accordingly, the imaging element of the twelfth aspect according to the technology of the present disclosure can detect the motion of the subject based on the captured image data more quickly than in a case where the detection portion is disposed outside the imaging element.

A thirteenth aspect according to the technology of the present disclosure is the imaging element according to any one aspect of the first aspect to the twelfth aspect, in which the imaging element is a laminated imaging element that includes the photoelectric conversion element and in which the photoelectric conversion element is laminated with the storage portion.

Accordingly, the imaging element of the thirteenth aspect according to the technology of the present disclosure can increase a speed of image processing of a plurality of frames, compared to a case where an imaging element of a type in which the photoelectric conversion element is not laminated with the storage portion is used.

A fourteenth aspect according to the technology of the present disclosure is an imaging apparatus comprising the imaging element according to any one aspect of the first aspect to the thirteenth aspect according to the technology of the present disclosure, and a control portion that performs a control for displaying, on a display portion, an image based on the output image data output by the output portion included in the imaging element.

Accordingly, the imaging apparatus of the fourteenth aspect according to the technology of the present disclosure can reduce power consumption, compared to a case where only the frame rate of reading out the image data by the reading portion is changed.

A fifteenth aspect according to the technology of the present disclosure is an image data processing method for an imaging element incorporating a reading portion that reads out, from a photoelectric conversion element, captured image data obtained by imaging a subject by the photoelectric conversion element, a storage portion that is capable of storing the captured image data read out from the photoelectric conversion element by the reading portion, and an output portion that outputs output image data based on the captured image data stored in the storage portion to an outside of the imaging element, the image data processing method comprising outputting the output image data to the outside at a first frame rate by the output portion included in the imaging element, reading out the captured image data from the photoelectric conversion element at a second frame rate by the reading portion, reading out the captured image data from the photoelectric conversion element using a first reading method or a second reading method having a smaller read data amount than the first reading method by the reading portion, in a case of the first reading method, setting the first frame rate to a frame rate corresponding to the second frame rate, in a case of the second reading method, setting the first frame rate to a frame rate lower than in a case of the first reading method, and switching between the first reading method and the second reading method in accordance with a detection result of a detection portion that detects a motion of the subject.

Accordingly, the image data processing method of the fifteenth aspect according to the technology of the present disclosure can reduce power consumption, compared to a case where only the frame rate of reading out the image data by the reading portion is changed.

A sixteenth aspect according to the technology of the present disclosure is a program for an imaging element incorporating a reading portion that reads out, from a photoelectric conversion element, captured image data obtained by imaging a subject by the photoelectric conversion element, a storage portion that is capable of storing the captured image data read out from the photoelectric conversion element by the reading portion, and an output portion that outputs output image data based on the captured image data stored in the storage portion to an outside of the imaging element, the program causing a computer to function as the reading portion and the output portion, in which the output portion outputs the output image data to the outside at a first frame rate, the reading portion reads out the captured image data from the photoelectric conversion element at a second frame rate, the reading portion reads out the captured image data from the photoelectric conversion element using a first reading method or a second reading method having a smaller read data amount than the first reading method, in a case of the first reading method, the first frame rate is a frame rate corresponding to the second frame rate, in a case of the second reading method, the first frame rate is a frame rate lower than in a case of the first reading method, and the first reading method and the second reading method are switched in accordance with a detection result of a detection portion that detects a motion of the subject.

Accordingly, the program of the sixteenth aspect according to the technology of the present disclosure can reduce power consumption, compared to a case where only the frame rate of reading out the image data by the reading portion is changed.

A seventeenth aspect according to the technology of the present disclosure is an imaging element comprising a processor and a memory incorporated in the imaging element, in which the processor reads out, from a photoelectric conversion element, captured image data obtained by imaging a subject by the photoelectric conversion element, the memory is capable of storing the captured image data read out from the photoelectric conversion element by the processor, the processor outputs output image data based on the captured image data stored in the memory to an outside of the imaging element, the processor outputs the output image data to the outside at a first frame rate, the processor reads out the captured image data from the photoelectric conversion element at a second frame rate, the processor reads out the captured image data from the photoelectric conversion element using a first reading method or a second reading method having a smaller read data amount than the first reading method, in a case of the first reading method, the first frame rate is a frame rate corresponding to the second frame rate, in a case of the second reading method, the first frame rate is a frame rate lower than in a case of the first reading method, and the first reading method and the second reading method are switched in accordance with a detection result of a detection portion that detects a motion of the subject.

According to one embodiment of the present invention, an effect of being able to reduce power consumption compared to a case where only the frame rate of reading out the image data by the reading portion is changed is achieved.

BRIEF DESCRIPTION OF THE DRAWINGS

Exemplary embodiments of the present invention will be described in detail based on the following figures, wherein.

DETAILED DESCRIPTION

Hereinafter, one example of an embodiment of an imaging apparatus according to the embodiment of the technology of the present disclosure will be described in accordance with the appended drawings.

Figure 1:
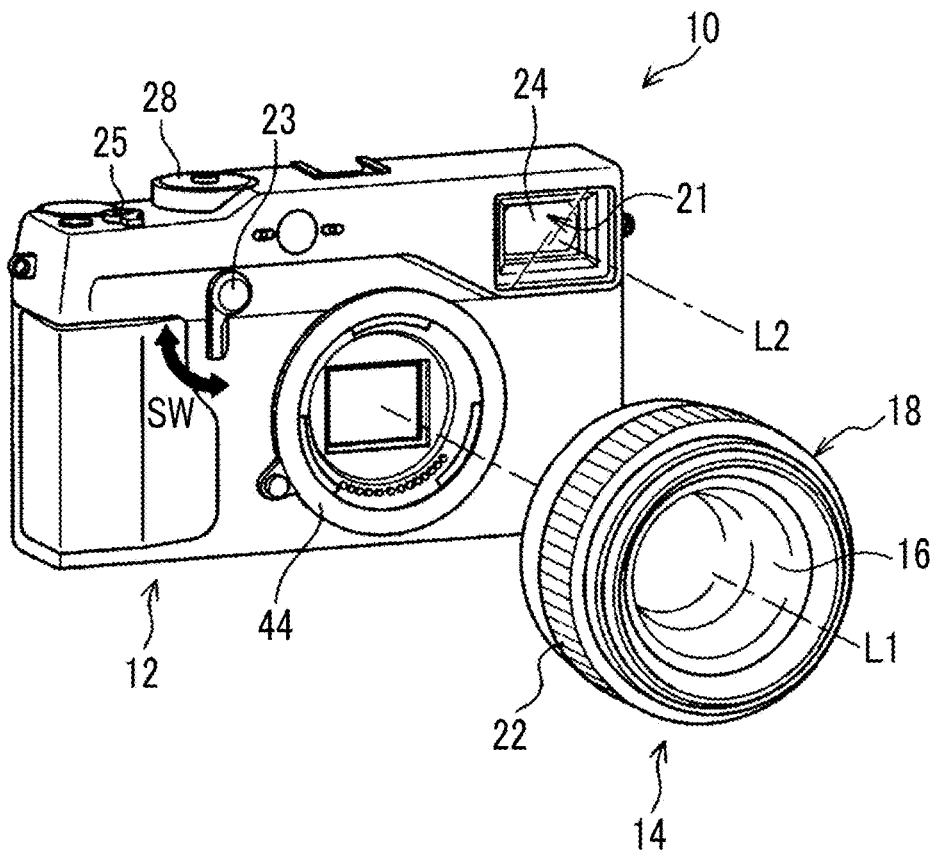
FIG. 1 is a perspective view illustrating one example of an exterior of an imaging apparatus that is an interchangeable lens camera according to an embodiment.

For example, as illustrated in FIG. 1, an imaging apparatus 10 is an interchangeable lens camera. The imaging apparatus 10 is a digital camera that includes an imaging apparatus main body 12 and an interchangeable lens 14 interchangeably mounted on the imaging apparatus main body 12, and does not include a reflex mirror. The interchangeable lens 14 includes an imaging lens 18 including a focus lens 16 that is movable in an optical axis direction by a manual operation.

A hybrid finder (registered trademark) 21 is disposed in the imaging apparatus main body 12. For example, the hybrid finder 21 here refers to a finder in which an optical view finder (hereinafter, referred to as the OVF) and an electronic view finder (hereinafter, referred to as the EVF) are selectively used. The abbreviation OVF stands for "Optical View Finder". The abbreviation EVF stands for "Electronic View Finder".

The interchangeable lens 14 is interchangeably mounted on the imaging apparatus main body 12. A focus ring 22 that is used at a time of a manual focus mode is disposed in a lens barrel of the interchangeable lens 14. The focus lens 16 moves in the optical axis direction in accordance with a manual rotation operation of the focus ring 22, and an image of subject light is formed on an imaging element 20 (refer to FIG. 3), described later, at a focal position corresponding to a subject distance.

A finder window 24 of the OVF included in the hybrid finder 21 is disposed on a front surface of the imaging apparatus main body 12. In addition, a finder switching lever (finder switching portion) 23 is disposed on the front surface of the imaging apparatus main body 12. In a case where the finder switching lever 23 is rotationally moved in a direction of an arrow SW, switching is performed between an optical image that is visually recognizable by the OVF, and an electronic image (live view image) that is visually recognizable by the EVF.

An optical axis L2 of the OVF is an optical axis different from an optical axis L1 of the interchangeable lens 14. A release button 25 and a dial 28 for setting such as a mode of an imaging system and a mode of a playback system are disposed on an upper surface of the imaging apparatus main body 12.

The release button 25 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position. Hereinafter, the "state where a push is performed to the half push position from the standby position" will be referred to as a "half push state", and the "state where a push is performed to the full push position from the standby position" will be referred to as a "full push state".

In the imaging apparatus 10 according to the present embodiment, an imaging mode and a playback mode are selectively set as an operation mode in accordance with an instruction from a user. In the imaging mode, the manual focus mode and an auto focus mode are selectively set in accordance with an instruction from the user. In the auto focus mode, an imaging condition is adjusted by causing the release button 25 to enter the half push state, and then, exposure is performed in a case where the full push state is subsequently set. That is, after an exposure state is set by an automatic exposure (AE) function by causing the release button 25 to enter the half push state, a focusing control is performed by an auto-focus (AF) function, and imaging is performed in a case where the release button 25 is caused to enter the full push state.

Figure 2:
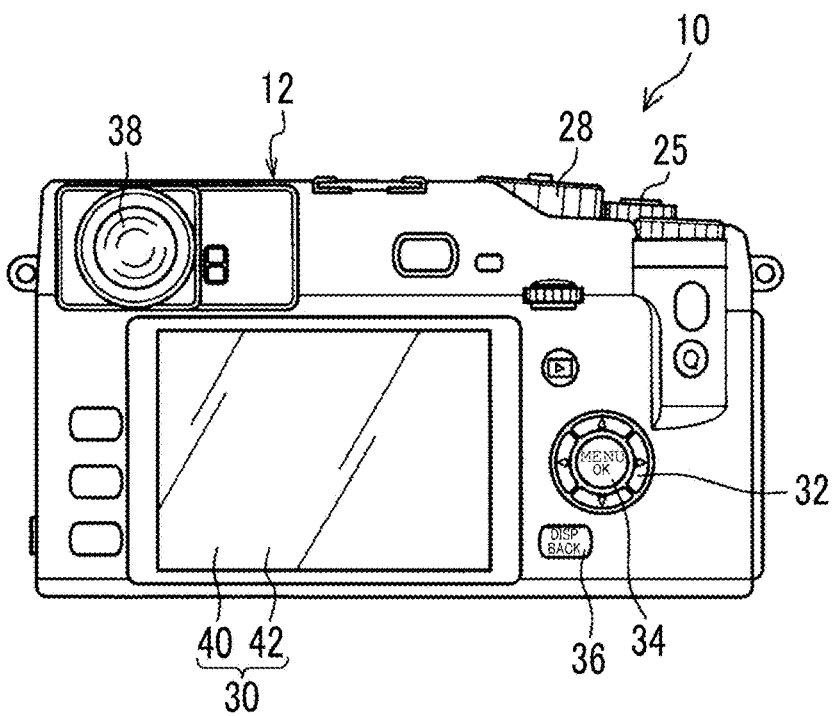
FIG. 2 is a rear view illustrating a rear surface side of the imaging apparatus according to the embodiment.

For example, as illustrated in FIG. 2, a touch panel display 30, a cross key 32, a menu key 34, an instruction button 36, and a finder eyepiece portion 38 are disposed on a rear surface of the imaging apparatus main body 12.

The touch panel display 30 comprises a liquid crystal display (hereinafter, referred to as a "first display") 40 and a touch panel 42 (refer to FIG. 3).

The first display 40 displays an image, a text information, and the like. The first display 40 is used for displaying a live view image (live preview image) that is one example of a consecutive frame image obtained by imaging in consecutive frames at a time of the imaging mode. The first display 40 is also used for displaying a still picture that is one example of a single frame image obtained by imaging in a single frame in a case where an instruction to image a still picture is provided. Furthermore, the first display 40 is used for displaying a playback image at a time of the playback mode and/or displaying a menu screen or the like.

The touch panel 42 is a transmissive touch panel and is overlaid on a surface of a display region of the first display 40. The touch panel 42 detects a contact of an instruction object such as a finger or a stylus pen. The touch panel 42 outputs detection result information indicating a detection result (presence or absence of the contact of the instruction object with the touch panel 42) to a predetermined output destination (for example, a CPU 52 (refer to FIG. 3) described later) in a predetermined cycle (for example, 100 milliseconds). In a case where the touch panel 42 detects the contact of the instruction object, the detection result information includes two-dimensional coordinates (hereinafter, referred to as the "coordinates") capable of specifying a contact position of the instruction object on the touch panel 42. In a case where the touch panel 42 does not detect the contact of the instruction object, the detection result information does not include the coordinates.

The cross key 32 has a function as a multifunction key that outputs various instruction signals for selecting one or a plurality of menus, zooming, and/or frame advance or the like. The menu key 34 is an operation key that has both of a function as a menu button for providing an instruction to display one or a plurality of menus on a screen of the first display 40 and a function as an instruction button for providing an instruction for confirmation, execution, and the like of a selected content. The instruction button 36 is operated in a case of deleting a desired target such as a selected item, canceling a designated content, and returning to an immediately previous operation state.

The imaging apparatus 10 has a still picture imaging mode and a motion picture imaging mode as an operation mode of the imaging system. The still picture imaging mode is an operation mode in which a still picture obtained by imaging a subject by the imaging apparatus 10 is recorded, and the motion picture imaging mode is an operation mode in which a motion picture obtained by imaging the subject by the imaging apparatus 10 is recorded.

Figure 3:
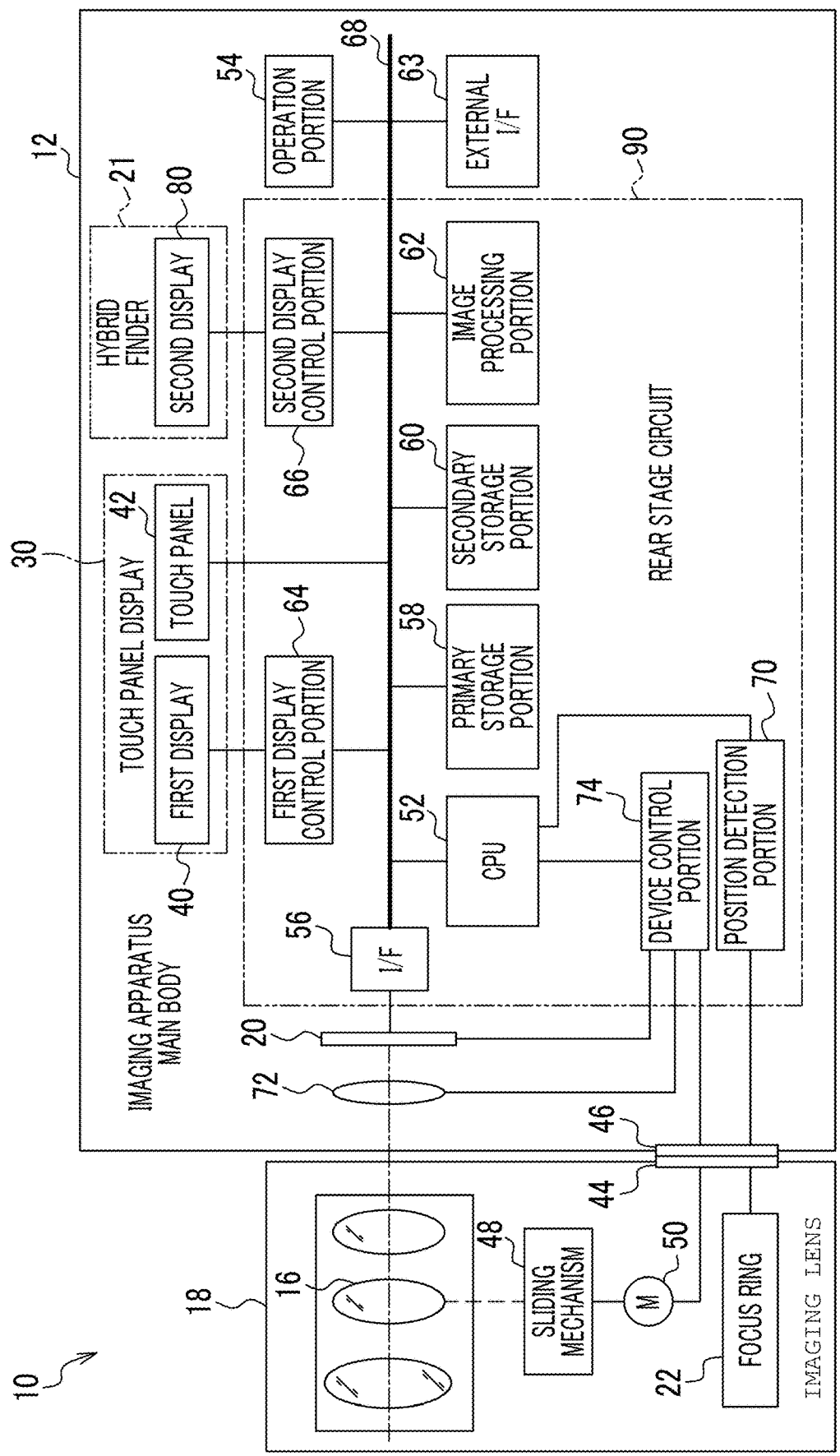
FIG. 3 is a block diagram illustrating one example of a hardware configuration of the imaging apparatus according to the embodiment.

For example, as illustrated in FIG. 3, the imaging apparatus 10 includes a mount 46 (refer to FIG. 1) comprised in the imaging apparatus main body 12, and a mount 44 on an interchangeable lens 14 side corresponding to the mount 46. The interchangeable lens 14 is interchangeably mounted on the imaging apparatus main body 12 by joining the mount 44 to the mount 46.

The imaging lens 18 includes a sliding mechanism 48 and a motor 50. The sliding mechanism 48 moves the focus lens 16 along the optical axis L1 by operating the focus ring 22. The focus lens 16 is slidably attached to the sliding mechanism 48 along the optical axis L1. The motor 50 is connected to the sliding mechanism 48, and the sliding mechanism 48 slides the focus lens 16 along the optical axis L1 by receiving motive power of the motor 50.

The motor 50 is connected to the imaging apparatus main body 12 through the mounts 44 and 46, and driving thereof is controlled in accordance with a command from the imaging apparatus main body 12. In the present embodiment, a stepping motor is applied as one example of the motor 50. Accordingly, the motor 50 operates in synchronization with pulse power in accordance with a command from the imaging apparatus main body 12. While an example in which the motor 50 is disposed in the imaging lens 18 is illustrated in the example illustrated in FIG. 3, the technology of the present disclosure is not limited thereto, and the motor 50 may be disposed in the imaging apparatus main body 12.

The imaging apparatus 10 is a digital camera that records the still picture and the motion picture obtained by imaging the subject. The imaging apparatus main body 12 comprises an operation portion 54, an external interface (I/F) 63, and a rear stage circuit 90. The rear stage circuit 90 is a circuit on a side of receiving data transmitted from the imaging element 20. In the present embodiment, an integrated circuit (IC) is employed as the rear stage circuit 90. Large-scale integration (LSI) is illustrated as one example of the IC.

The imaging apparatus 10 operates in an operation mode of any of a low-speed mode and a high-speed mode. The low-speed mode refers to an operation mode in which the rear stage circuit 90 performs processing at a low frame rate. In the present embodiment, 60 frames per second (fps) is employed as the low frame rate.

Meanwhile, the high-speed mode refers to an operation mode in which the rear stage circuit 90 performs processing at a high frame rate. In the present embodiment, 240 fps is employed as the high frame rate.

While 60 fps is illustrated as the low frame rate and 240 fps is illustrated as the high frame rate in the present embodiment, the technology of the present disclosure is not limited thereto. The low frame rate may be 30 fps, and the high frame rate may be 120 fps. The point is that the high frame rate is higher than the low frame rate.

The rear stage circuit 90 includes the central processing unit (CPU) 52, an I/F 56, a primary storage portion 58, a secondary storage portion 60, an image processing portion 62, a first display control portion 64, a second display control portion 66, a position detection portion 70, and a device control portion 74. A single CPU is illustrated as the CPU 52 in the present embodiment. However, the technology of the present disclosure is not limited thereto, and a plurality of CPUs may be employed instead of the CPU 52. That is, various types of processing executed by the CPU 52 may be executed by one processor or a plurality of physically separated processors.

In the present embodiment, each of the image processing portion 62, the first display control portion 64, the second display control portion 66, the position detection portion 70, and the device control portion 74 is implemented by an application specific integrated circuit (ASIC). However, the technology of the present disclosure is not limited thereto. For example, instead of the ASIC, at least one of a programmable logic device (PLD) or a field-programmable gate array (FPGA) may be employed. Alternatively, at least one of the ASIC, the PLD, or the FPGA may be employed. Alternatively, a computer including a CPU, a read only memory (ROM), and a random access memory (RAM) may be employed. The CPU may be a single CPU or a plurality of CPUs. In addition, at least one of the image processing portion 62, the first display control portion 64, the second display control portion 66, the position detection portion 70, or the device control portion 74 may be implemented by a combination of a hardware configuration and a software configuration.

The CPU 52, the I/F 56, the primary storage portion 58, the secondary storage portion 60, the image processing portion 62, the first display control portion 64, the second display control portion 66, the operation portion 54, the external I/F 63, and the touch panel 42 are connected to each other through a bus 68.

The CPU 52 controls the entire imaging apparatus 10. In the imaging apparatus 10 according to the present embodiment, at a time of the auto focus mode, the CPU 52 performs the focusing control by controlling driving of the motor 50 such that a contrast value of the image obtained by imaging is maximized. In addition, at the time of the auto focus mode, the CPU 52 calculates AE information that is a physical quantity indicating brightness of the image obtained by imaging. In a case where the release button 25 is caused to enter the half push state, the CPU 52 derives a shutter speed and an F number corresponding to the brightness of the image indicated by the AE information. The exposure state is set by controlling each related portion to achieve the derived shutter speed and the F number.

The primary storage portion 58 means a volatile memory and refers to, for example, a RAM. The secondary storage portion 60 means a non-volatile memory and refers to, for example, a flash memory or a hard disk drive (HDD).

The operation portion 54 is a user interface that is operated by the user in a case of providing various instructions to the rear stage circuit 90. The operation portion 54 includes the release button 25, the dial 28, the finder switching lever 23, the cross key 32, the menu key 34, and the instruction button 36. Various instructions received by the operation portion 54 are output to the CPU 52 as an operation signal, and the CPU 52 executes processing corresponding to the operation signal input from the operation portion 54.

The position detection portion 70 is connected to the CPU 52. The position detection portion 70 is connected to the focus ring 22 through the mounts 44 and 46, detects a rotation angle of the focus ring 22, and outputs rotation angle information indicating a rotation angle that is a detection result to the CPU 52. The CPU 52 executes processing corresponding to the rotation angle information input from the position detection portion 70.

In a case where the imaging mode is set, image light showing the subject is formed on a light receiving surface of the color imaging element 20 through the imaging lens 18 including the focus lens 16 which is movable by a manual operation, and a mechanical shutter 72.

The device control portion 74 is connected to the CPU 52. In addition, the device control portion 74 is connected to the imaging element 20 and the mechanical shutter 72. Furthermore, the device control portion 74 is connected to the motor 50 of the imaging lens 18 through the mounts 44 and 46.

The device control portion 74 controls the imaging element 20, the mechanical shutter 72, and the motor 50 under control of the CPU 52.

Figure 4:
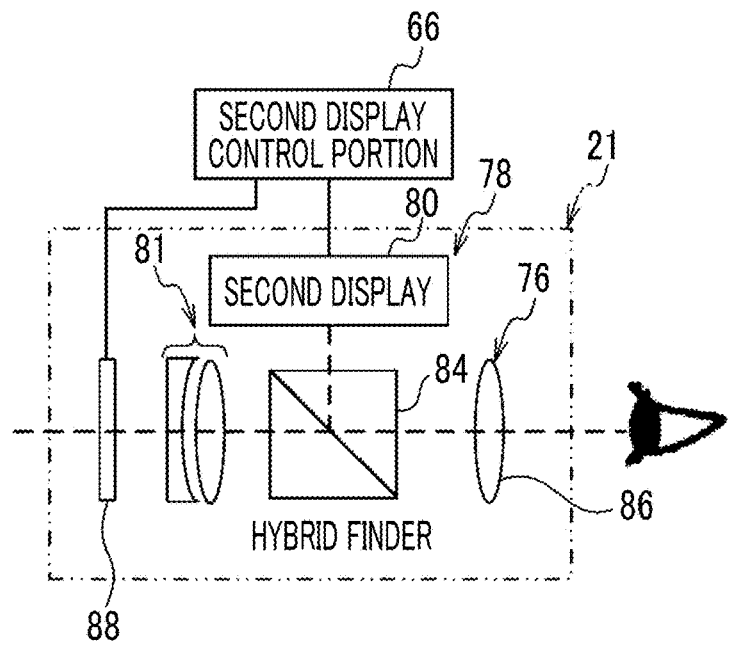
FIG. 4 is a schematic configuration diagram illustrating one example of a configuration of a hybrid finder included in the imaging apparatus according to the embodiment.

For example, as illustrated in FIG. 4, the hybrid finder 21 includes an OVF 76 and an EVF 78. The OVF 76 is a reverse Galilean finder including an objective lens 81 and an eyepiece lens 86, and the EVF 78 includes a second display 80, a prism 84, and the eyepiece lens 86.

A liquid crystal shutter 88 is arranged in front of the objective lens 81. The liquid crystal shutter 88 blocks light such that the optical image is not incident on the objective lens 81 in a case of using the EVF 48.

The prism 84 guides the electronic image or various information to be displayed on the second display 80 to the eyepiece lens 86 by reflecting the electronic image or various information, and combines the optical image with the electronic image and/or various information to be displayed on the second display 80.

In a case where the finder switching lever 23 is rotationally moved in the direction of the arrow SW illustrated in FIG. 1, an OVF mode in which the optical image is visually recognizable by the OVF 76 and an EVF mode in which the electronic image is visually recognizable by the EVF 78 are alternately switched each time the finder switching lever 23 is rotationally moved.

In a case of the OVF mode, the second display control portion 66 enables the optical image to be visually recognized from the eyepiece portion by controlling the liquid crystal shutter 88 to enter a non-light blocking state. In a case of the EVF mode, the second display control portion 66 enables only the electronic image displayed on the second display 80 to be visually recognized from the eyepiece portion by controlling the liquid crystal shutter 88 to enter a light blocking state.

Figure 5:
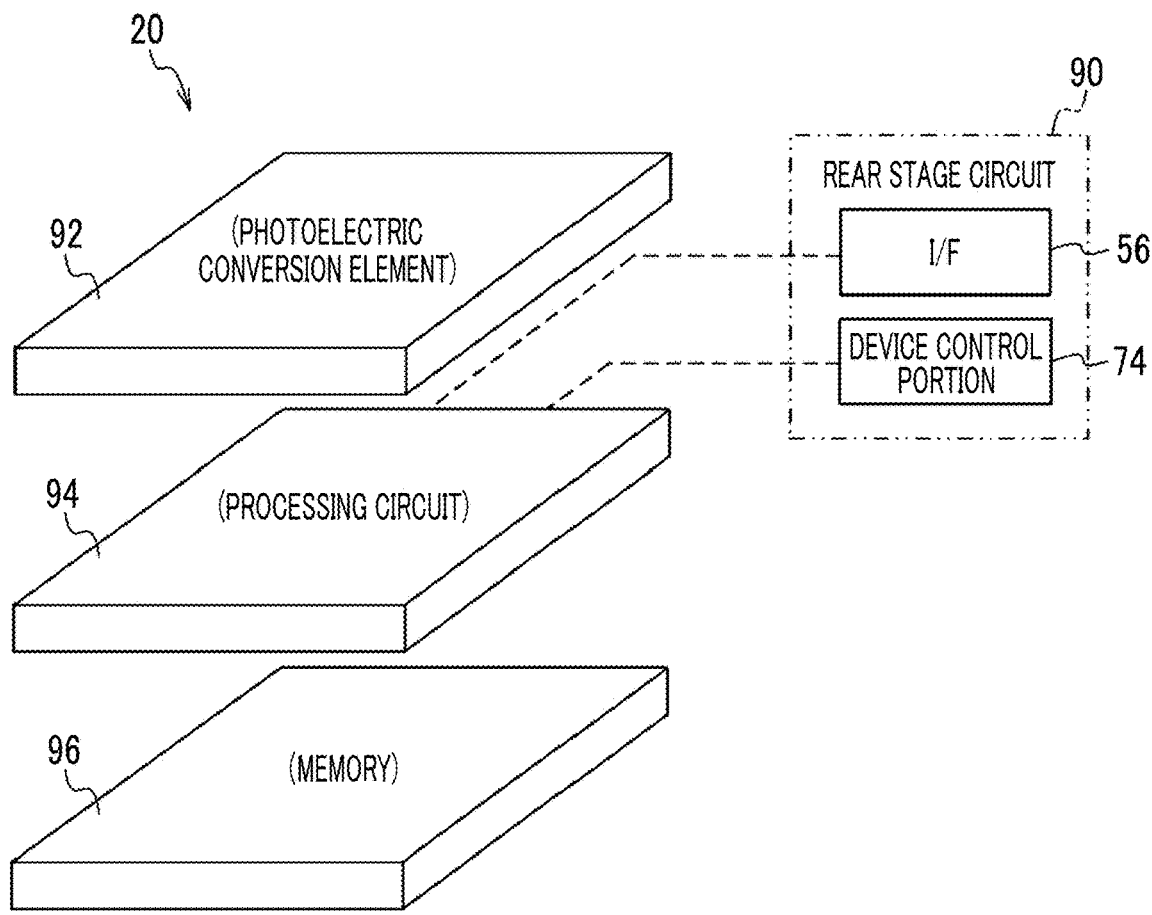
FIG. 5 is a schematic configuration diagram illustrating one example of a schematic configuration of an imaging element included in the imaging apparatus according to the embodiment.

The imaging element 20 is one example of a "laminated imaging element" according to the embodiment of the technology of the present disclosure. For example, the imaging element 20 is a complementary metal oxide semiconductor (CMOS) image sensor. For example, as illustrated in FIG. 5, a photoelectric conversion element 92, a processing circuit 94, and a memory 96 are incorporated in the imaging element 20. In the imaging element 20, the photoelectric conversion element 92 is laminated with the processing circuit 94 and the memory 96. The memory 96 is one example of a storage portion according to the embodiment of the technology of the present disclosure.

The processing circuit 94 is, for example, LSI, and the memory 96 is, for example, a RAM. A DRAM is employed as one example of the memory 96 in the present embodiment. However, the technology of the present disclosure is not limited thereto, and a static random access memory (SRAM) may be used.

The processing circuit 94 is implemented by an ASIC in the present embodiment. However, the technology of the present disclosure is not limited thereto. For example, at least one of a PLD or an FPGA may be employed instead of the ASIC. Alternatively, at least one of the ASIC, the PLD, or the FPGA may be employed. Alternatively, a computer including a CPU, a ROM, and a RAM may be employed.

The CPU may be a single CPU or a plurality of CPUs. Alternatively, the processing circuit 94 may be implemented by a combination of a hardware configuration and a software configuration.

The photoelectric conversion element 92 includes a plurality of photosensors arranged in a matrix form. In the present embodiment, photodiodes are employed as one example of the photosensors. Photodiodes of "4896×3265" pixels are illustrated as one example of the plurality of photosensors.

The photoelectric conversion element 92 comprises color filters, and the color filters include a G filter corresponding to green (G) that most contributes to obtaining a brightness signal, an R filter corresponding to red (R), and a B filter corresponding to blue (B). In the present embodiment, the G filter, the R filter, and the B filter are arranged with a predetermined periodicity in each of a row direction (horizontal direction) and a column direction (vertical direction) for the plurality of photodiodes of the photoelectric conversion element 92. Thus, the imaging apparatus 10 can perform processing in accordance with a repeating pattern in a case of performing demosaicing and the like on R, G, and B signals. The demosaicing refers to processing of calculating all color information for each pixel from a mosaic image corresponding to color filter arrangement of a single plate color imaging element. For example, in a case of an imaging element consisting of color filters of three colors of R, G, and B, the demosaicing means processing of calculating color information about all of R, G, and B for each pixel from a mosaic image consisting of R, G, and B.

While the CMOS image sensor is illustrated as the imaging element 20, the technology of the present disclosure is not limited thereto. For example, the technology of the present disclosure is also established in a case where the photoelectric conversion elements 92 is a charge coupled device (CCD) image sensor.

The imaging element 20 has a so-called electronic shutter function and controls an electric charge accumulation time period of each photodiode in the photoelectric conversion element 92 by performing the electronic shutter function under control of the device control portion 74. The electric charge accumulation time period refers to a so-called shutter speed.

The processing circuit 94 is controlled by the device control portion 74. The processing circuit 94 reads out captured image data that is obtained by imaging the subject by the photoelectric conversion element 92. The "captured image data" here refers to image data indicating the subject. The captured image data is signal electric charges accumulated in the photoelectric conversion element 92. The processing circuit 94 performs analog/digital (A/D) conversion on the captured image data read out from the photoelectric conversion element 92. The processing circuit 94 stores, in the memory 96, the captured image data obtained by performing the A/D conversion on the captured image data. The processing circuit 94 acquires the captured image data from the memory 96 and outputs, to the I/F 56 of the rear stage circuit 90, output image data that is image data based on the acquired captured image data. Hereinafter, for convenience of description, the "output image data that is image data based on the captured image data" will be simply referred to as the "output image data".

The captured image data is broadly classified into low resolution image data indicating a low resolution image and a high resolution image data indicating high resolution image. The high resolution image is an image having higher resolution than the low resolution image. In the present embodiment, the low resolution image refers to an image read out in an interlaced manner. Specifically, the low resolution image refers to a vertically ¼ thinned image. The high resolution image refers to a non-thinned image.

Figure 10:
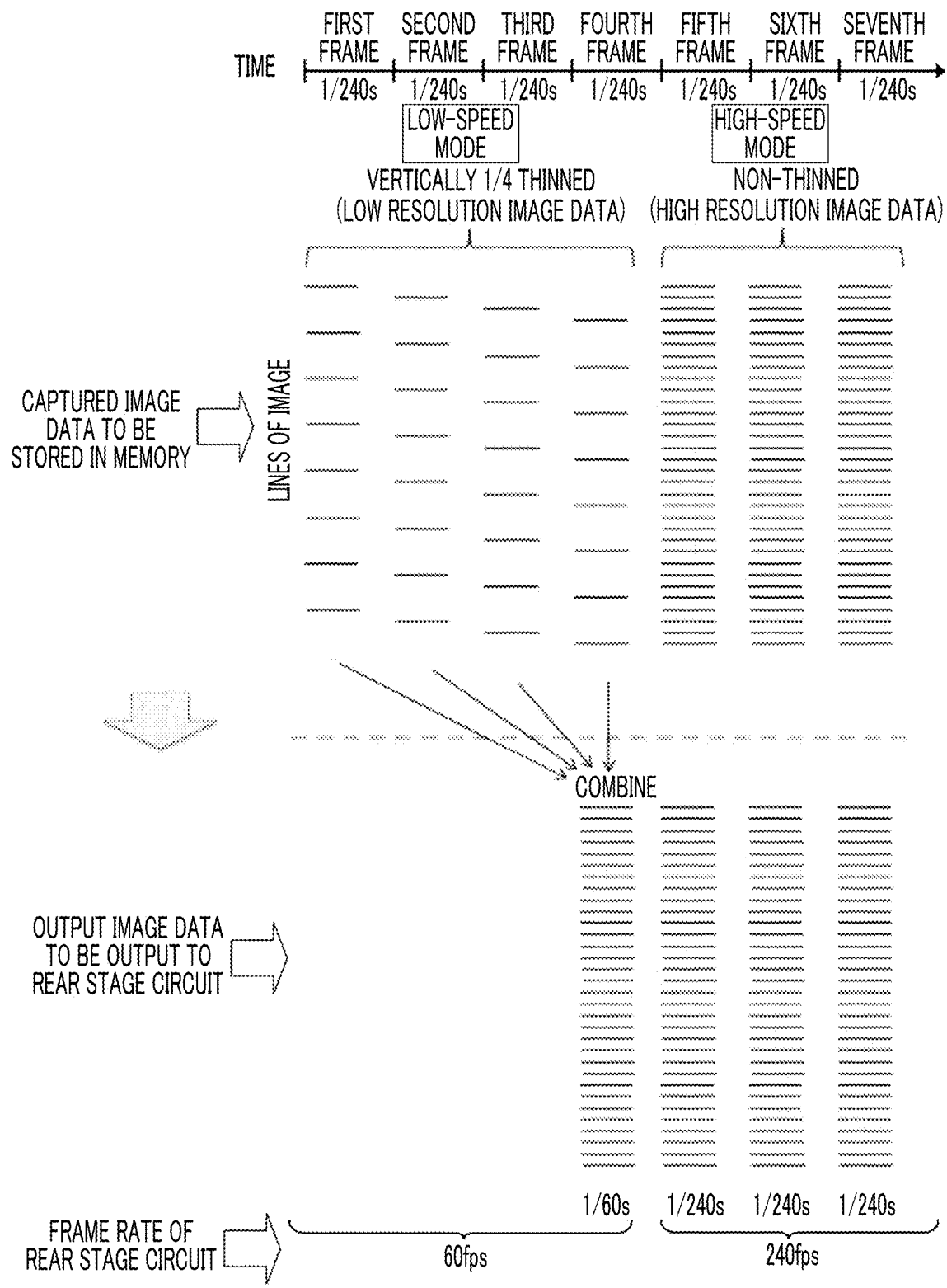
FIG. 10 is a schematic state transition diagram illustrating one example of time-series aspects of captured image data and output image data under each operation mode of a low-speed mode and a high-speed mode.

For example, as illustrated in FIG. 10, the vertically ¼ thinned image is an image obtained by thinning out horizontal lines of the image in the vertical direction by skipping three lines at a time. In the example illustrated in FIG. 10, an image indicated by the low resolution image data of each of a first frame to a fourth frame illustrated as the captured image data to be stored in the memory 96 represents the vertically ¼ thinned image.

For example, the low resolution image data of each of the first frame to the fourth frame illustrated in FIG. 10 is one example of a "thinned image frame in which pixels are thinned out compared to a case where the subject is imaged by the photoelectric conversion element under a predetermined imaging condition" according to the embodiment of the technology of the present disclosure. In addition, for example, the low resolution image data of the first frame to the fourth frame illustrated in FIG. 10 is one example of a "plurality of thinned image frames in which pixels are thinned out compared to a case where the subject is imaged by the photoelectric conversion element under a predetermined imaging condition, and in which the pixels at different locations are thinned out" according to the embodiment of the technology of the present disclosure. Furthermore, for example, the low resolution image data of the first frame to the fourth frame illustrated in FIG. 10 is one example of a "plurality of pieces of thinned image data obtained by thinning out pixels at different locations for each frame" according to the embodiment of the technology of the present disclosure. In addition, imaging of the subject by all photodiodes in the photoelectric conversion element 92 in the present embodiment is one example of the "predetermined imaging condition" according to the embodiment of the technology of the present disclosure.

For example, as illustrated in FIG. 10, in a case where a reading cycle corresponding to four frames is set as one cycle, the low resolution image indicated by the low resolution image data is thinned out by shifting the horizontal lines one line at a time in the vertical direction for each frame in one cycle.

Meanwhile, for example, as illustrated in FIG. 10, the non-thinned image refers to an image in which pixels are not thinned out. In the example illustrated in FIG. 10, the non-thinned image is illustrated in a fifth frame to a seventh frame. One example of the non-thinned image is an image indicated by image data that is obtained by imaging the subject by all photodiodes in the photoelectric conversion element 92. In the present embodiment, "all photodiodes" refer to usable photodiodes that do not have defects.

The output image data is broadly classified into first output image data indicating a first output image and second output image data indicating a second output image. For example, as illustrated in FIG. 10, the second output image data refers to combined data obtained by combining the low resolution image data of four frames. This means that the second output image is a combined image obtained by combining the vertically ¼ thinned images of four frames.

Meanwhile, for example, as illustrated in FIG. 10, the first output image data refers to the high resolution image data of one frame. This means that the first output image is the high resolution image.

While an example of a form in which the first output image data is the high resolution image data of one frame is illustrated in the present embodiment, the technology of the present disclosure is not limited thereto. For example, the first output image data may be image data obtained by performing image processing on the high resolution image data of one frame.

Hereinafter, for convenience of description, the first output image and the second output image will be simply referred to as an "output image" unless otherwise necessary to distinguish therebetween for description.

Figure 6:
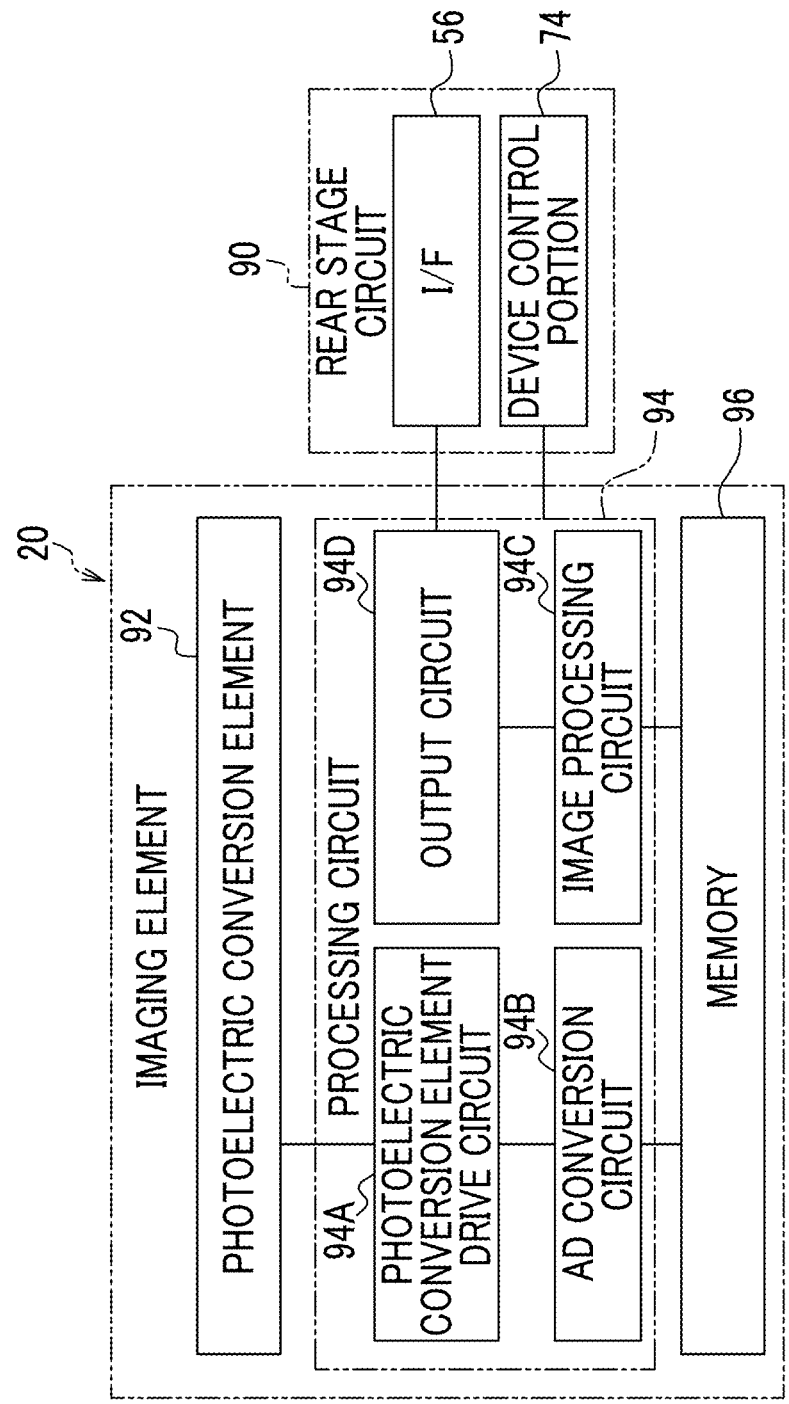
FIG. 6 is a block diagram illustrating one example of a main configuration of the imaging element included in the imaging apparatus according to the embodiment.

For example, as illustrated in FIG. 6, the processing circuit 94 includes a photoelectric conversion element drive circuit 94A, an analog-to-digital (AD) conversion circuit 94B, an image processing circuit 94C, and an output circuit 94D and operates under control of the CPU 52. The photoelectric conversion element drive circuit 94A is connected to the photoelectric conversion element 92 and the AD conversion circuit 94B. The memory 96 is connected to the AD conversion circuit 94B and the image processing circuit 94C. The image processing circuit 94C is connected to the output circuit 94D. The output circuit 94D is connected to the I/F 56 of the rear stage circuit 90.

The photoelectric conversion element drive circuit 94A is one example of a "reading portion" according to the embodiment of the technology of the present disclosure. The photoelectric conversion element drive circuit 94A controls the photoelectric conversion element 92 and reads out analog captured image data from the photoelectric conversion element 92 under control of the device control portion 74. The AD conversion circuit 94B digitizes the captured image data read out by the photoelectric conversion element drive circuit 94A and stores the digitized captured image data in the memory 96.

The memory 96 is a memory capable of storing the captured image data of a plurality of frames adjacent in imaging timing. The image processing circuit 94C acquires the output image data from the captured image data stored in the memory 96 by random access to the memory 96. The image processing circuit 94C performs necessary signal processing on the acquired output image data.

The output circuit 94D outputs the output image data subjected to the signal processing by the image processing circuit 94C to an outside of the imaging element 20 at the first frame rate. For example, the "outside of the imaging element 20" here refers to the I/F 56 of the rear stage circuit 90.

In the imaging element 20, reading out by the photoelectric conversion element drive circuit 94A, storage of the captured image data in the memory 96 by the AD conversion circuit 94B, and processing by the image processing circuit 94C are performed at the second frame rate. However, the technology of the present disclosure is not limited thereto.

For example, among reading out by the photoelectric conversion element drive circuit 94A, storage of the captured image data in the memory 96 by the AD conversion circuit 94B, and processing by the image processing circuit 94C, reading out by the photoelectric conversion element drive circuit 94A may be performed at the second frame rate. Alternatively, reading out by the photoelectric conversion element drive circuit 94A and storage of the captured image data in the memory 96 by the AD conversion circuit 94B may be performed at the second frame rate among reading out by the photoelectric conversion element drive circuit 94A, storage of the captured image data in the memory 96 by the AD conversion circuit 94B, and processing by the image processing circuit 94C. The point is that at least reading out by the photoelectric conversion element drive circuit 94A is performed at the second frame rate.

The first frame rate is a variable frame rate. The second frame rate can be set to a frame rate higher than the first frame rate.

In the processing circuit 94, a first reading method and a second reading method are selectively used, and the photoelectric conversion element drive circuit 94A reads out the captured image data from the photoelectric conversion element 92 using the first reading method or the second reading method having a smaller read data amount than the first reading method. That is, for example, as illustrated in Table 1, the high resolution image data is read out from the photoelectric conversion element 92 in the first reading method, and the low resolution image data is read out from the photoelectric conversion element 92 in the second reading method.

TABLE 1

| Reading Method | Data Amount |
| --- | --- |
| First Reading Method | Large (High Resolution Image Data) |
| Second Reading Method | Small (Low Resolution Image data) |

For example, as illustrated in Table 2, the first reading method is used in the processing circuit 94 in a case where the operation mode of the imaging apparatus 10 is the high-speed mode, and the second reading method is used in the processing circuit 94 in a case where the operation mode of the imaging apparatus 10 is the low-speed mode.

TABLE 2

| Operation Mode of Imaging Apparatus | Reading Method | First Frame Rate | Second Frame Rate |
| --- | --- | --- | --- |
| High-Speed Mode | First Reading Method | High (240 fps) | High (240 fps) |
| Low-Speed Mode | Second Reading Method | Low (60 fps) | High (240 fps) |

In a case of the first reading method, the first frame rate is a frame rate corresponding to the second frame rate. In a case of the second reading method, the first frame rate is a frame rate lower than in a case of the first reading method.

In the present embodiment, a frame rate corresponding to the frame rate in a case of the first reading method is employed as one example of the second frame rate in the second reading method. However, the technology of the present disclosure is not limited thereto. For example, a frame rate different from the frame rate in a case of the first reading method may be used, or the second frame rate may be forcibly changed in a case where a predetermined condition is satisfied in a state where the first reading method is employed. One example of the "predetermined condition" here is illustrated by a condition that an instruction to change the second frame rate is provided from the user through the touch panel 42 and/or the operation portion 54 in a case of the first reading method.

In the present embodiment, for example, as illustrated in Table 2, in a case of the first reading method, the processing circuit 94 sets the first frame rate and the second frame rate to the high frame rate, that is, 240 fps. In addition, in the present embodiment, for example, as illustrated in Table 2, in a case of the second reading method, the processing circuit 94 sets the first frame rate to the low frame rate, that is, 60 fps, and sets the second frame rate to the high frame rate, that is, 240 fps.

The image processing circuit 94C is one example of a "detection portion" according to the embodiment of the technology of the present disclosure. The image processing circuit 94C detects a motion of the subject. The processing circuit 94 switches between the first reading method and the second reading method in accordance with a detection result of the image processing circuit 94C.

Specifically, the image processing circuit 94C detects the motion of the subject based on a plurality of pieces of the low resolution image data or a plurality of pieces of the high resolution image data. The processing circuit 94 sets the first reading method in a case where the motion of the subject is detected by the image processing circuit 94C, and sets the second reading method in a case where the motion of the subject is not detected by the image processing circuit 94C.

Next, actions of parts of the imaging apparatus 10 according to the embodiment of the technology of the present disclosure will be described.

Hereinafter, for convenience of description, the first display 40 and the second display 80 will be referred to as a "display apparatus" without a reference sign unless otherwise necessary to distinguish therebetween for description. The display apparatus is one example of a "display portion" according to the embodiment of the technology of the present disclosure. In addition, hereinafter, for convenience of description, the first display control portion 64 and the second display control portion 66 will be referred to as a "display control portion" without a reference sign unless otherwise necessary to distinguish therebetween for description. The display control portion is one example of a "control portion" according to the embodiment of the technology of the present disclosure. In addition, hereinafter, for convenience of description, a case of displaying the live view image on the display apparatus will be described.

Figure 7:
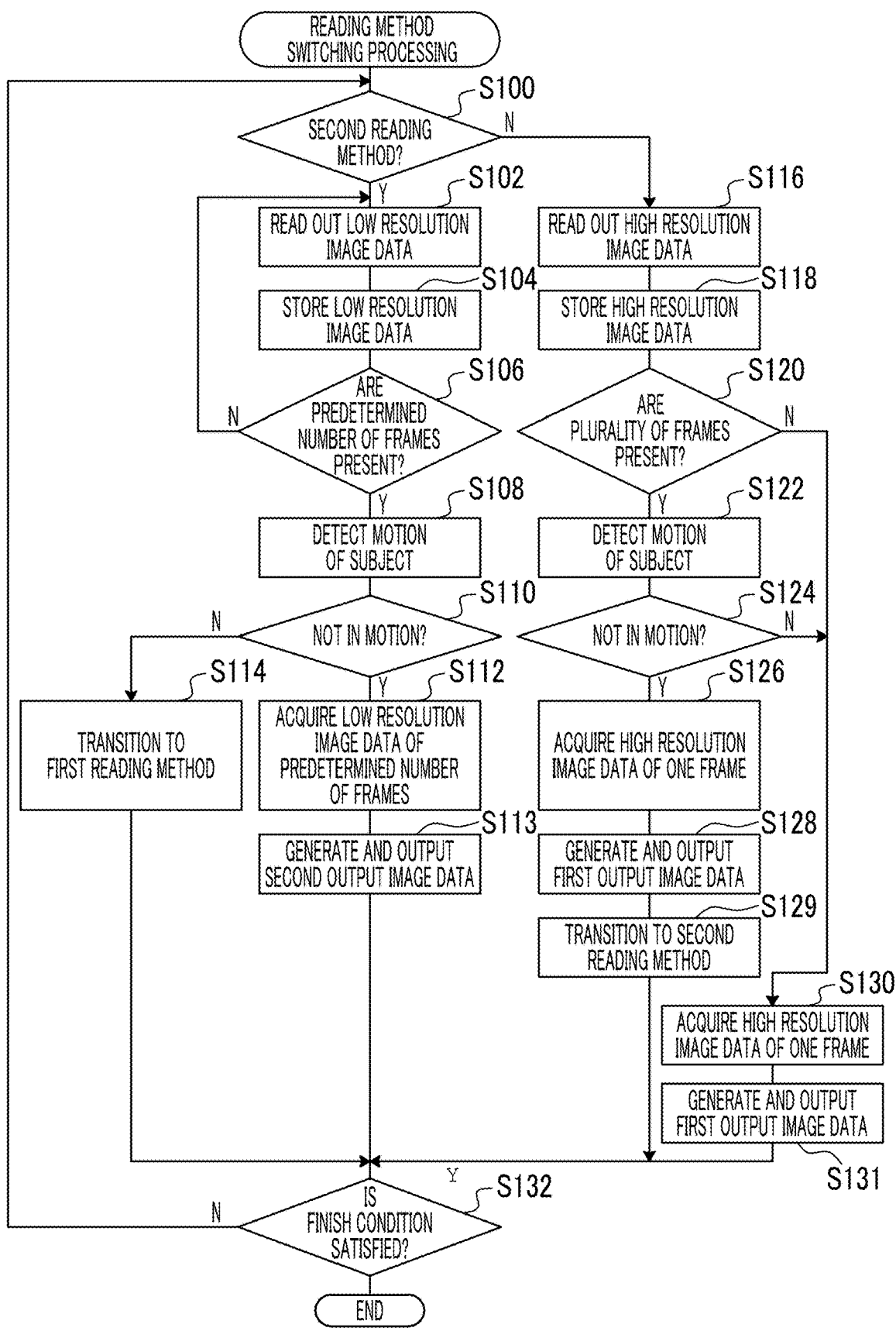
FIG. 7 is a flowchart illustrating one example of a flow of reading method switching processing according to the embodiment.

First, reading method switching processing executed by the processing circuit 94 will be described with reference to FIG. 7. The reading method switching processing illustrated in FIG. 7 is performed by the processing circuit 94 at the second frame rate. Hereinafter, for convenience of description, the memory 96 will be assumed to be a memory capable of storing the captured image data of four frames using a FIFO method.

In the reading method switching processing illustrated in FIG. 7, first, in step S100, the processing circuit 94 determines whether or not a reading method currently set is the second reading method. In step S100, in a case where the reading method currently set is the second reading method, a positive determination is made, and the reading method switching processing transitions to step S102. In step S100, in a case where the reading method currently set is the first reading method, a negative determination is made, and the reading method switching processing transitions to step S116.

In step S102, the photoelectric conversion element drive circuit 94A reads out the low resolution image data from the photoelectric conversion element 92, and then, the reading method switching processing transitions to step S104.

In step S104, the AD conversion circuit 94B stores the low resolution image data read out in step S102 in the memory 96, and then, the reading method switching processing transitions to step S106.

In step S106, the image processing circuit 94C determines whether or not the low resolution image data of a predetermined number of frames is stored in the memory 96. The predetermined number of frames refer to four frame. However, the technology of the present disclosure is not limited thereto. For example, in a case where n is set to an integer greater than or equal to two, the predetermined number of frames are n frames in a case where a vertically 1/n thinned image is employed as the low resolution image.

In step S106, in a case where the low resolution image data of the predetermined number of frames is not stored in the memory 96, a negative determination is made, and the reading method switching processing transitions to step S102. In step S106, in a case where the low resolution image data of the predetermined number of frames is stored in the memory 96, a positive determination is made, and the reading method switching processing transitions to step S108.

In step S108, the image processing circuit 94C detects the motion of the subject based on the low resolution image data of the predetermined number of frames stored in the memory 96, and then, the reading method switching processing transitions to step S110. The motion of the subject is detected based on a difference in captured image data between frames adjacent in time. For example, in a case where the difference is greater than a threshold value, the subject in motion is detected. In a case where the difference is less than or equal to the threshold value, the subject not in motion is detected.

Figure 11:
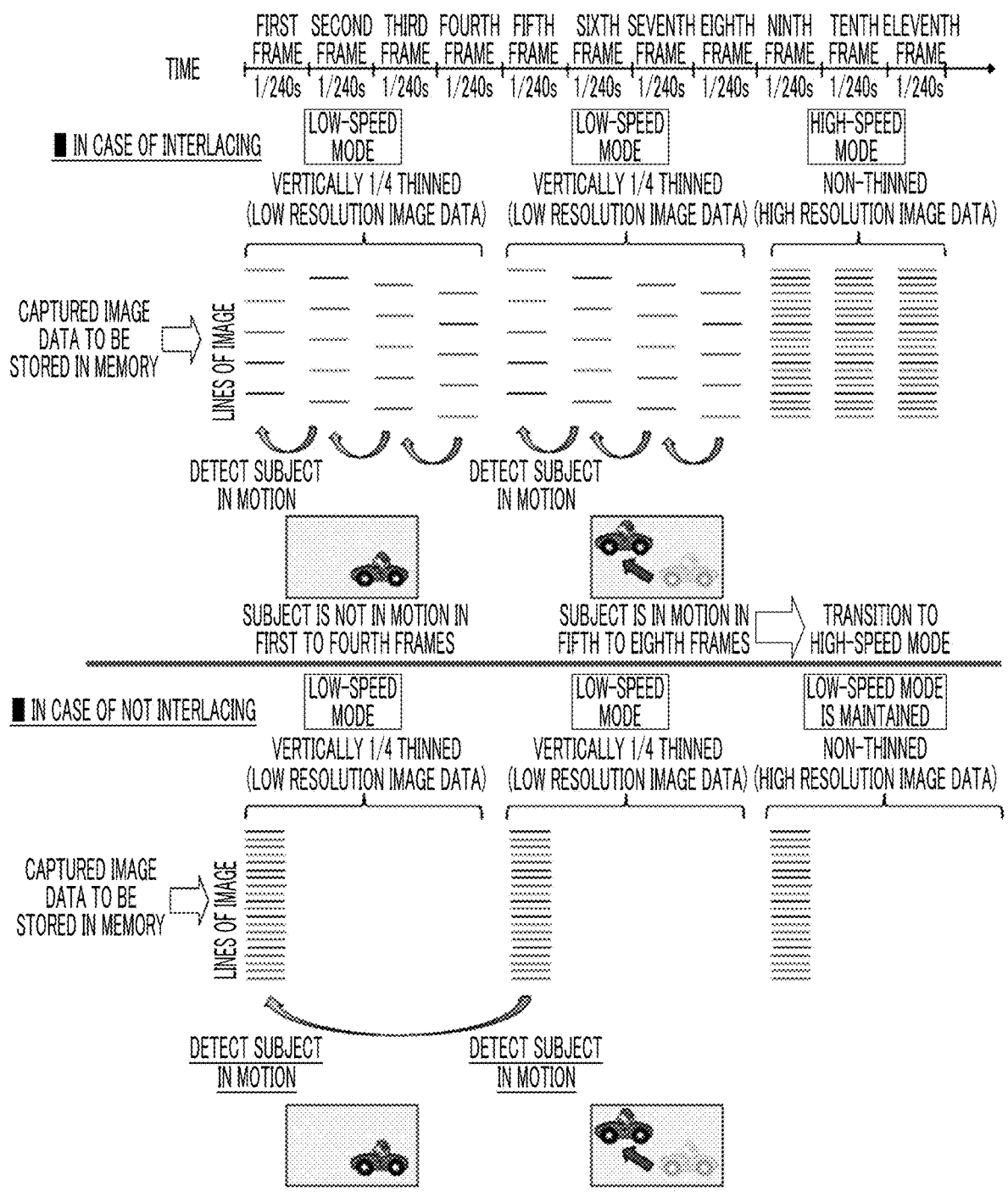
FIG. 11 is a descriptive diagram for describing a difference in detection accuracy of a motion of a subject between a case of reading in an interlaced manner and a case of not reading in an interlaced manner.

For example, as illustrated in an upper part of FIG. 11, the low resolution image data read out in an interlaced manner is stored in the memory 96 by executing processing of step S102 to step S106. For example, as illustrated in FIG. 11, the subject in motion is detected from the low resolution image data of the fifth frame to an eighth frame by executing processing of step S108.

Meanwhile, for example, as illustrated in a lower part of FIG. 11, in a case where the high resolution image data is read out at 60 fps without reading in an interlaced manner, the subject in motion cannot be detected in a period of the fifth to eighth frames of reading in an interlaced manner.

Detection of the motion of the subject may be performed based on the low resolution image data between adjacent frames among the fifth frame to the eighth frame or may be performed based on the low resolution image data between adjacent frames by skipping one frame, for example, the fifth frame and the seventh frame.

In the present embodiment, for convenience of description, a case where processing of step S108 is executed in a case where a positive determination is made in step S106, that is, in a case where the low resolution image data of four frames is stored in the memory 96, is illustrated. However, the technology of the present disclosure is not limited thereto. In the present embodiment, the processing circuit 94 and the memory 96 are incorporated in the imaging element 20. Thus, for example, in the example illustrated in the upper part of FIG. 11, the motion of the subject may be detected using the fifth frame and the sixth frame while the low resolution image data of the seventh frame and the eighth frame is read out.

In step S110, the image processing circuit 94C determines whether or not the subject is not in motion. In step S110, in a case where the subject is not in motion, a positive determination is made, and the reading method switching processing transitions to step S112. In step S110, in a case where the subject is in motion, a negative determination is made, and the reading method switching processing transitions to step S114.

In step S112, the image processing circuit 94C acquires the low resolution image data of the predetermined number of frames from the memory 96, and then, the reading method switching processing transitions to step S113.

In step S113, the image processing circuit 94C generates the second output image data based on the low resolution image data of the predetermined number of frames acquired in step S112. The image processing circuit 94C outputs the generated second output image data to the output circuit 94D, and then, the reading method switching processing transitions to step S132.

In step S114, the processing circuit 94 transitions the reading method from the second reading method to the first reading method, and then, the reading method switching processing transitions to step S132.

The CPU 52 transitions the operation mode of the imaging apparatus 10 from the low-speed mode to the high-speed mode in accordance with transitions of the reading method from the second reading method to the first reading method. Conversely, the CPU 52 transitions the operation mode of the imaging apparatus 10 from the high-speed mode to the low-speed mode in accordance with transitions of the reading method from the first reading method to the second reading method.

In step S116, the photoelectric conversion element drive circuit 94A reads out the high resolution image data from the photoelectric conversion element 92, and then, the reading method switching processing transitions to step S118.

In step S118, the AD conversion circuit 94B stores the high resolution image data read out in step S116 in the memory 96, and then, the reading method switching processing transitions to step S120.

In step S120, the image processing circuit 94C determines whether or not the low resolution image data of a plurality of frames is stored in the memory 96. For example, the plurality of frames refer to two or more frames adjacent in imaging period. In step S120, in a case where the high resolution image data of the plurality of frames is not stored in the memory 96, a negative determination is made, and the reading method switching processing transitions to step S130. In step S120, in a case where the high resolution image data of the plurality of frames is stored in the memory 96, a positive determination is made, and the reading method switching processing transitions to step S122.

In step S122, the image processing circuit 94C detects the motion of the subject based on the high resolution image data of the plurality of frames stored in the memory 96, and then, the reading method switching processing transitions to step S124.

In step S124, the image processing circuit 94C determines whether or not the subject is not in motion. In step S124, in a case where the subject is not in motion, a positive determination is made, and the reading method switching processing transitions to step S126. In step S124, in a case where the subject is in motion, a negative determination is made, and the reading method switching processing transitions to step S130.

In step S126, the image processing circuit 94C acquires the high resolution image data of one frame from the memory 96, and then, the reading method switching processing transitions to step S128. The high resolution image data of one frame acquired from the memory 96 by executing processing of step S126 is the high resolution image data that is least recently stored among the high resolution image data of the plurality of frames stored in the memory 96.

In step S128, the image processing circuit 94C generates the first output image data based on the high resolution image data of one frame acquired in step S126. The image processing circuit 94C outputs the generated first output image data to the output circuit 94D, and then, the reading method switching processing transitions to step S129.

In step S129, the processing circuit 94 transitions the reading method from the first reading method to the second reading method, and then, the reading method switching processing transitions to step S132.

In step S130, the image processing circuit 94C acquires the high resolution image data of one frame from the memory 96, and then, the reading method switching processing transitions to step S131.

In step S131, the image processing circuit 94C generates the first output image data based on the high resolution image data of one frame acquired in step S130. The image processing circuit 94C outputs the generated first output image data to the output circuit 94D, and then, the reading method switching processing transitions to step S132.

In step S132, the image processing circuit 94C determines whether or not a reading method switching processing finish condition that is a condition for finishing the reading method switching processing is satisfied. For example, a condition that an instruction to finish the reading method switching processing is received by the touch panel 42 and/or the operation portion 54 is illustrated as the reading method switching processing finish condition. In addition, for example, a condition that a predetermined time period exceeds from a start of the reading method switching processing without pushing the release button 25 is illustrated as the reading method switching processing finish condition. For example, the "predetermined time period" here is five minutes. The predetermined time period may be a fixed value or a variable value that can be changed in accordance with an instruction provided from the user.

In step S132, in a case where the reading method switching processing finish condition is not satisfied, a negative determination is made, and the reading method switching processing transitions to step S100. In step S132, in a case where the reading method switching processing finish condition is satisfied, a positive determination is made, and the image processing circuit 94C finishes the reading method switching processing.

Next, image data output processing executed by the output circuit 94D of the processing circuit 94 will be described with reference to FIG. 8.

Figure 8:
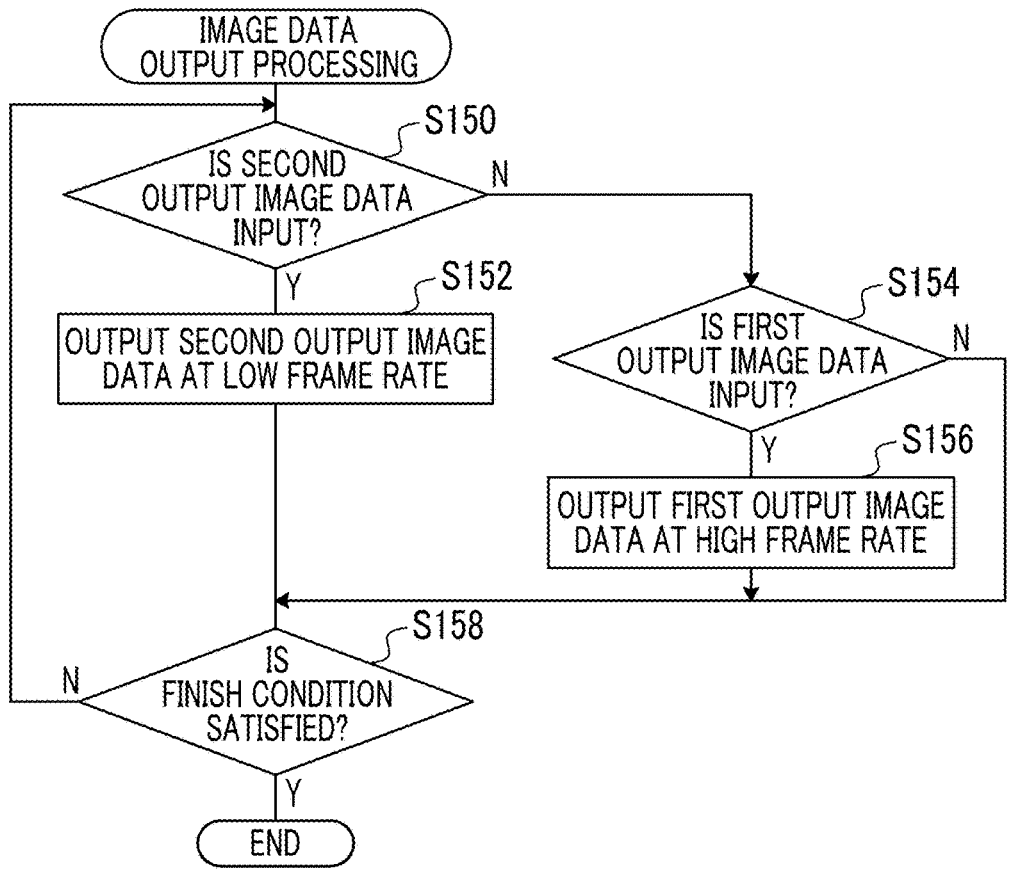
FIG. 8 is a flowchart illustrating one example of a flow of image data output processing according to the embodiment.

In the image data output processing illustrated in FIG. 8, first, in step S150, the output circuit 94D determines whether or not the second output image data is input from the image processing circuit 94C. In step S150, the second output image data input from the image processing circuit 94C is the second output image data output in step S113 included in the reading method switching processing illustrated in FIG. 7.

In step S150, in a case where the second output image data is input from the image processing circuit 94C, a positive determination is made, and the image data output processing transitions to step S152. In step S150, in a case where the second output image data is not input from the image processing circuit 94C, a negative determination is made, and the image data output processing transitions to step S154.

In step S152, the output circuit 94D outputs the second output image data input in step S150 to the I/F 56 of the rear stage circuit 90 at the low frame rate, and then, the image data output processing transitions to step S162.

In step S154, the output circuit 94D determines whether or not the first output image data is input from the image processing circuit 94C. In step S154, the first output image data input from the image processing circuit 94C is the first output image data output in step S129 or step S131 included in the reading method switching processing illustrated in FIG. 7.

In step S154, in a case where the first output image data is input from the image processing circuit 94C, a positive determination is made, and the image data output processing transitions to step S156. In step S154, in a case where the first output image data is not input from the image processing circuit 94C, a negative determination is made, and the image data output processing transitions to step S158.

In step S156, the output circuit 94D outputs the first output image data acquired in step S154 to the I/F 56 of the rear stage circuit 90 at the high frame rate, and then, the image data output processing transitions to step S158.

In step S158, the image processing circuit 94C determines whether or not an image data output processing finish condition that is a condition for finishing the image data output processing is satisfied. For example, the image data output processing finish condition is the same condition as the reading method switching processing finish condition.

In step S158, in a case where the image data output processing finish condition is not satisfied, a negative determination is made, and the image data output processing transitions to step S150. In step S158, in a case where the image data output processing finish condition is satisfied, a positive determination is made, and the output circuit 94D finishes the image data output processing.

Next, the display control processing executed by the display control portion of the rear stage circuit 90 will be described with reference to FIG. 9. For convenience of description, it is assumed that the output image data is output to the rear stage circuit 90 from the output circuit 94D by executing the image data output processing illustrated in FIG. 8, and that the output image data is input into the CPU 52 and the image processing portion 62.

Figure 9:
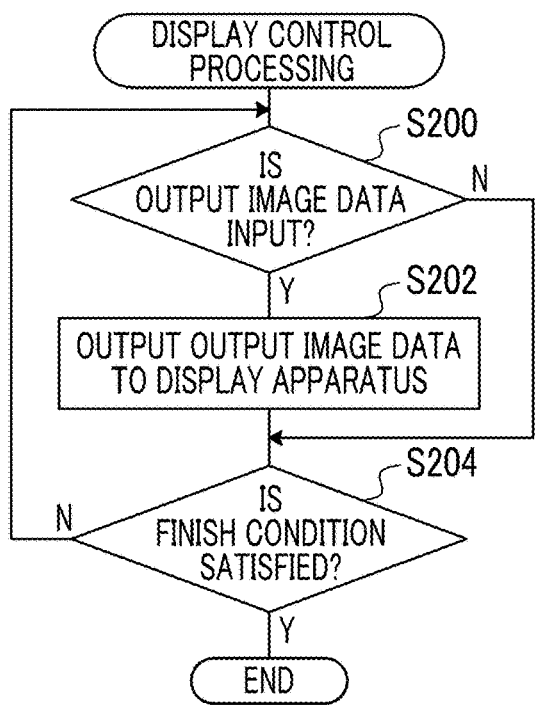
FIG. 9 is a flowchart illustrating one example of a flow of display control processing according to the embodiment.

In the display control processing illustrated in FIG. 9, in step S200, the display control portion determines whether or not the output image data is input from the image processing portion 62. In step S200, in a case where the output image data is not input from the image processing portion 62, a negative determination is made, and the display control processing transitions to step S204. In step S200, in a case where the output image data is input from the image processing portion 62, a positive determination is made, and the display control processing transitions to step S202.

In step S202, the display control portion outputs the output image data to the display apparatus as graphics data, and then, the display control processing transitions to step S204. In a case where the output image data is output to the display apparatus by executing processing of step S202, the display apparatus displays the output image indicated by the output image data. For example, in a case where entirety image data is included in the output image data, the display apparatus displays an entirety image indicated by the entirety image data. The "entirety image" here refers to an image indicating an entirety of the subject.

In step S204, the display control portion determines whether or not a display control processing finish condition that is a condition for finishing the display control processing is satisfied. For example, the display control processing finish condition is the same condition as the reading method switching processing finish condition.

In step S204, in a case where the display control processing finish condition is not satisfied, a negative determination is made, and the display control processing transitions to step S200. In step S204, in a case where the display control processing finish condition is satisfied, a positive determination is made, and the display control portion finishes the display control processing.

As described above, in the imaging apparatus 10, the processing circuit 94 and the memory 96 are incorporated in the imaging element 20. The captured image data is read out from the photoelectric conversion element 92 by the photoelectric conversion element drive circuit 94A. The read captured image data is stored in the memory 96. The output image data based on the captured image data stored in the memory 96 is output to the I/F 56 of the rear stage circuit 90 by the output circuit 94D. The output image data is output to the I/F 56 by the output circuit 94D at the first frame rate. The captured image data is read out from the photoelectric conversion element 92 by the photoelectric conversion element drive circuit 94A at the second frame rate. The captured image data is read out from the photoelectric conversion element 92 by the photoelectric conversion element drive circuit 94A using the first reading method or the second reading method. The motion of the subject is detected by the image processing circuit 94C, and the first reading method and the second reading method are switched in accordance with the detection result. The high resolution image data is read out in the first reading method, and the low resolution image data is read out in the second reading method.

Accordingly, the imaging apparatus 10 can reduce power consumption, compared to a case where only the frame rate of reading out the captured image data is changed.

In the imaging apparatus 10, the memory 96 is capable of storing the captured image data in a plurality of frames adjacent in imaging timing.

Accordingly, the imaging apparatus 10 can implement various multiple types of image processing, compared to a case where a plurality of pieces of the captured image data of the same frame are stored in the memory 96.

In the imaging apparatus 10, the motion of the subject is detected by the image processing circuit 94C based on the captured image data of the plurality of frames stored in the memory 96.

Accordingly, the imaging apparatus 10 can implement high accuracy detection of the motion of the subject by the image processing circuit 94C, compared to a case where a plurality of pieces of the captured image data of the same frame are stored in the memory 96.

In the imaging apparatus 10, the first frame rate is changed in accordance with switching between the first reading method and the second reading method.

Accordingly, the imaging apparatus 10 can reduce power consumption required for outputting the output image data, compared to a case where the same frame rate as the second frame rate is used at all times as the first frame rate.

In the imaging apparatus 10, the second frame rate is fixed regardless of switching between the first reading method and the second reading method.

Accordingly, the imaging apparatus 10 can stabilize a time period required for processing inside the imaging element 20, compared to a case where the second frame rate is changed in accordance with switching between the first reading method and the second reading method.

In the imaging apparatus 10, in the second reading method, one frame of the captured image data is an image frame in which pixels are thinned out compared to a case where the subject is imaged by the photoelectric conversion element 92 under the predetermined imaging condition. The captured image data obtained in a "case where the subject is imaged by the photoelectric conversion element 92 under the predetermined imaging condition" means the "high resolution image data" in the embodiment. The "image frame in which pixels are thinned out" refers to the "low resolution image data" in the embodiment.

Accordingly, the imaging apparatus 10 can reduce power consumption, compared to a case where one frame of the captured image data is a frame in which pixels are not thinned out.

In the imaging apparatus 10, in a case where the captured image data is read out using the second reading method, a plurality of pieces of the low resolution image data in which pixels at different locations are thinned out are read out as the captured image data. The second output image data obtained by combining the plurality of pieces of low resolution image data is output to the rear stage circuit 90.

Accordingly, the imaging apparatus 10 can implement high image quality using the output image data, compared to a case where a single thinned image frame is output as the output image data.

In the imaging apparatus 10, in the second reading method, the captured image data is read out from the photoelectric conversion element 92 in a state where pixels are thinned out. That is, in the second reading method, the low resolution image data is read out from the photoelectric conversion element 92.

Accordingly, the imaging apparatus 10 can reduce power consumption required for reading out the captured image data by the photoelectric conversion element drive circuit 94A, compared to a case where the captured image data in which pixels are not thinned out is read out by the photoelectric conversion element drive circuit 94A.

In the imaging apparatus 10, in the second reading method, the plurality of pieces of low resolution image data obtained by thinning out pixels at different locations for each frame are read out and stored in the memory 96. The motion of the subject is detected by the image processing circuit 94C based on the plurality of pieces of low resolution image data stored in the memory 96.

Accordingly, the imaging apparatus 10 can detect the motion of the subject more quickly than in a case where the high resolution image data of one frame is stored in the memory 96 in the same period as a period in which the plurality of pieces of low resolution image data are stored in the memory 96.

In the imaging apparatus 10, the first reading method is used in a case where the motion of the subject is detected by the image processing circuit 94C, and the second reading method is used in a case where the motion of the subject is not detected by the image processing circuit 94C.

Accordingly, the imaging apparatus 10 can reduce power consumption, compared to a case where the first reading method is employed at all times regardless of the motion of the subject.

In the imaging apparatus 10, the image processing circuit 94C is included in the imaging element 20. Accordingly, the imaging apparatus 10 can detect the motion of the subject based on the captured image data more quickly than in a case where the image processing circuit 94C is disposed outside the imaging element 20.

In the imaging apparatus 10, the imaging element 20 is a laminated CMOS image sensor that includes the photoelectric conversion element 92 and in which the photoelectric conversion element 92 is laminated with the memory 96.

Accordingly, the imaging apparatus 10 can increase a speed of image processing of a plurality of frames, compared to a case where an imaging element of a type in which the photoelectric conversion element 92 is not laminated with the memory 96 is used.

While an example of a form in which the low resolution image data is read out from the captured image data obtained by imaging the subject by all photodiodes in the photoelectric conversion element 92 is illustratively described in the embodiment, the technology of the present disclosure is not limited thereto. For example, in the second reading method, the subject may be imaged by the photoelectric conversion element 92 in a state where pixels are thinned out. For example, the subject may be imaged using only a photodiode capable of obtaining the vertically ¼ thinned image. Accordingly, power consumption required for imaging by the photoelectric conversion element 92 can be reduced, compared to a case where the subject is imaged by the photoelectric conversion element 92 in a state where pixels are not thinned out.

While imaging of the subject by all photodiodes in the photoelectric conversion element 92 is illustrated in the embodiment as one example of the "predetermined imaging condition" according to the embodiment of the technology of the present disclosure, the technology of the present disclosure is not limited thereto. As another example of the "predetermined imaging condition" according to the embodiment of the technology of the present disclosure, imaging of the subject in a motion picture recording mode in which a motion picture having higher image quality than the live view image displayed on the display apparatus is recorded in a memory card connected to the external I/F 63 is illustrated.

While the vertically ¼ thinned image is illustrated as the low resolution image in the embodiment, the technology of the present disclosure is not limited thereto. For example, the vertically 1/n thinned image other than the vertically ¼ thinned image may be employed as the low resolution image. In addition, instead of the image in which the horizontal lines are thinned out in the vertical direction, an image in which vertical lines are thinned out in the horizontal direction may be employed as the low resolution image. In addition, an image that is thinned out in units of pixels or pixel groups of a few pixels in accordance with a predetermined rule may be employed as the low resolution image.

In the embodiment, the non-thinned image is employed as the high resolution image, and the vertically ¼ thinned image is employed as the low resolution image. However, the technology of the present disclosure is not limited thereto. For example, the vertically ¼ thinned image may be employed as the high resolution image, and a vertically 1/16 thinned image may be employed as the low resolution image. The point is that the low resolution image is an image having a higher degree of thinning than the high resolution image.

While a case where the output image data is used for displaying the live view image is described in the embodiment, the technology of the present disclosure is not limited thereto. For example, by the CPU 52, the output image data may be stored in the secondary storage portion 60 in the rear stage circuit 90 or may be output to an outside of the imaging apparatus 10 through the external I/F 63.

Figure 12:
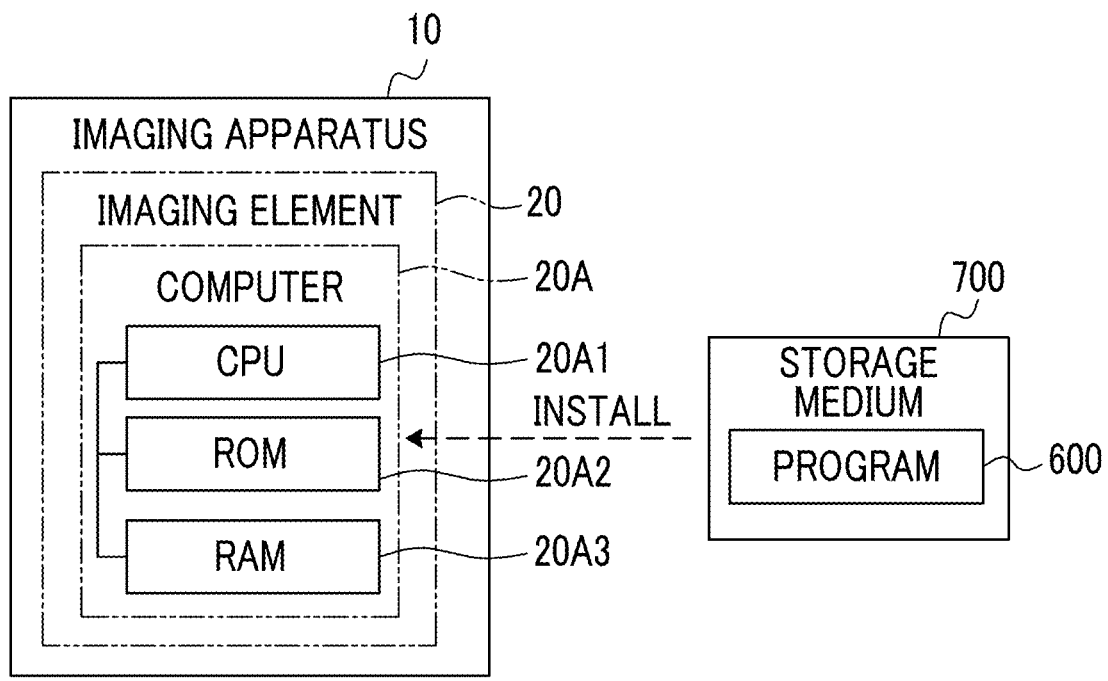
FIG. 12 is a conceptual diagram illustrating one example of a state where a program according to the embodiment is installed on the imaging element from a storage medium storing the program according to the embodiment.

While the processing circuit 94 implemented by the ASIC is illustrated in the embodiment, the reading method switching processing and the image data output processing may be implemented by a computer using a software configuration. In this case, for example, as illustrated in FIG. 12, a program 600 for causing a computer 20A incorporated in the imaging element 20 to execute the reading method switching processing and the image data output processing is stored in a storage medium 700. The computer 20A comprises a CPU 20A1, a ROM 20A2, and a RAM 20A3. The program 600 of the storage medium 700 is installed on the computer 20A, and the CPU 20A1 of the computer 20A executes the reading method switching processing and the image data output processing in accordance with the program 600. A single CPU is illustrated as the CPU 20A1. However, the technology of the present disclosure is not limited thereto, and a plurality of CPUs may be employed instead of the CPU 20A1. That is, the reading method switching processing and/or the image data output processing may be executed by one processor or a plurality of physically separated processors.

Any portable storage medium such as a solid state drive (SSD) or a universal serial bus (USB) is illustrated as one example of the storage medium 700.

Alternatively, the program 600 may be stored in a storage portion of another computer, a server apparatus, or the like connected to the computer 20A through a communication network (not illustrated), and the program 600 may be downloaded in accordance with a request from the imaging apparatus 10 or the like. In this case, the downloaded program 600 is executed by the computer 20A.

The computer 20A may be disposed outside the imaging element 20. In this case, the computer 20A may control the processing circuit 94 in accordance with the program 600.

Various processors illustrated below can be used as a hardware resource for executing various types of processing described in the embodiment. Various types of processing described in the embodiment are illustrated by the reading method switching processing, the image data output processing, and the display control processing. For example, as described above, a CPU that is a general-purpose processor functioning as a hardware resource for executing various types of processing according to the embodiment of the technology of the present disclosure by executing software, that is, the program, is illustrated as a processor. In addition, a dedicated electric circuit such as an FPGA, a PLD, or an ASIC that is a processor having a circuit configuration dedicatedly designed to execute a specific type of processing is illustrated as a processor. A memory is incorporated in or connected to any of the processors, and any of the processors executes various types of processing using the memory.

The hardware resource for executing various types of processing according to the embodiment of the technology of the present disclosure may be configured with one of those various processors or may be configured with a combination of two or more processors of the same type or different types (for example, a combination of a plurality of FPGAs or a combination of a CPU and an FPGA). Alternatively, the hardware resource for executing various types of processing according to the embodiment of the technology of the present disclosure may be one processor.

As an example of a configuration with one processor, first, as represented by a computer such as a client and a server, a form in which one processor is configured with a combination of one or more CPUs and software and this processor functions as the hardware resource for executing various types of processing according to the embodiment of the technology of the present disclosure is available. Second, as represented by a system-on-a-chip (SoC) or the like, a form of using a processor that implements, by one IC chip, a function of the entire system including a plurality of hardware resources for executing various types of processing according to the embodiment of the technology of the present disclosure is available. Accordingly, various types of processing according to the embodiment of the technology of the present disclosure are implemented using one or more of above various processors as a hardware resource.

Furthermore, as a hardware structure of those various processors, more specifically, an electric circuit in which circuit elements such as semiconductor elements are combined can be used.

Figure 13:
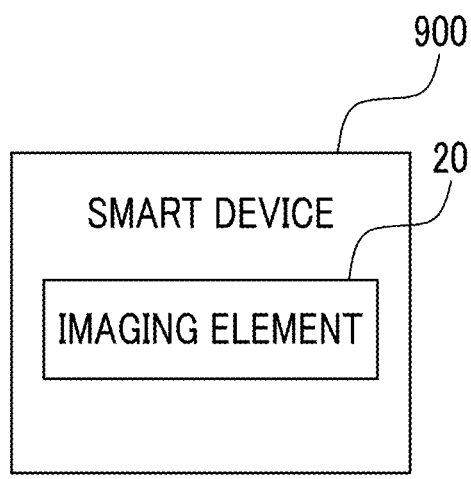
FIG. 13 is a block diagram illustrating one example of a schematic configuration of a smart device in which the imaging element according to the embodiment is incorporated.

While an interchangeable lens camera is illustrated as the imaging apparatus 10 in the embodiment, the technology of the present disclosure is not limited thereto. For example, the technology of the present disclosure may be applied to a smart device 900 illustrated in FIG. 13. For example, the smart device 900 illustrated in FIG. 13 is one example of the imaging apparatus according to the embodiment of the technology of the present disclosure. The imaging element 20 described in the embodiments is mounted on the smart device 900. Even with the smart device 900 configured in such a manner, the same action and effect as the imaging apparatus 10 described in the embodiment are achieved. The technology of the present disclosure can be applied to not only the smart device 900 but also a personal computer or a wearable terminal apparatus.

While the first display 40 and the second display 80 are illustrated as the display apparatus in the embodiment, the technology of the present disclosure is not limited thereto. For example, a separate display that is retrofit into the imaging apparatus main body 12 may be used as the "display portion" according to the embodiment of the technology of the present disclosure.

The reading method switching processing, the image data output processing, and the display control processing described in the embodiment are merely one example. Accordingly, unnecessary steps may be removed, new steps may be added, or a processing order may be changed without departing from a gist of the present disclosure.

Above described contents and illustrated contents are detailed description for parts according to the embodiment of the technology of the present disclosure and are merely one example of the technology of the present disclosure. For example, description related to the above configurations, functions, actions, and effects is description related to one example of configurations, functions, actions, and effects of the parts according to the embodiment of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiment of the technology of the present disclosure.

In the present specification, "A and/or B" has the same meaning as "at least one of A or B". This means that "A and/or B" may be only A, may be only B, or may be a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards is specifically and individually indicated to be incorporated by reference.

What is claimed is:

1. An imaging element comprising:
    a reading circuit that reads out, from a photoelectric conversion element, captured image data obtained by imaging a subject by the photoelectric conversion element and is incorporated in the imaging element;
    a memory that is capable of storing the captured image data read out from the photoelectric conversion element by the reading circuit and is incorporated in the imaging element; and
    an output circuit that outputs output image data based on the captured image data stored in the memory to an outside of the imaging element and is incorporated in the imaging element,
    wherein the output circuit outputs the output image data to the outside at a first frame rate,
    the reading circuit reads out the captured image data from the photoelectric conversion element at a second frame rate,
    the reading circuit reads out the captured image data from the photoelectric conversion element using a first reading method or a second reading method having a smaller read data amount than the first reading method,
    in a case of the first reading method, the first frame rate is a frame rate corresponding to the second frame rate, and in a case of the second reading method, the first frame rate is a frame rate lower than in the case of the first reading method, and
    the first reading method and the second reading method are switched in accordance with a detection result of a detection circuit that detects a motion of the subject.

2. The imaging element according to claim 1,
    wherein the memory is capable of storing the captured image data in a plurality of frames adjacent in imaging timing.

3. The imaging element according to claim 2,
    wherein the detection circuit detects the motion of the subject based on the captured image data of the plurality of frames stored in the memory.

4. The imaging element according to claim 1,
    wherein the first frame rate is changed in accordance with switching between the first reading method and the second reading method.

5. The imaging element according to claim 1,
    wherein the second frame rate is fixed regardless of switching between the first reading method and the second reading method.

6. The imaging element according to claim 1,
    wherein in the second reading method, one frame of the captured image data is a thinned image frame in which pixels are thinned out compared to a case where the subject is imaged by the photoelectric conversion element under a predetermined imaging condition.

7. The imaging element according to claim 1,
    wherein in a case where the captured image data is read out by the reading circuit using the second reading method, the captured image data is a plurality of thinned image frames in which pixels are thinned out compared to a case where the subject is imaged by the photoelectric conversion element under a predetermined imaging condition, and in which the pixels at different locations are thinned out, and
    the output image data is image data obtained by combining the plurality of thinned image frames.

8. The imaging element according to claim 6,
wherein in the second reading method, the subject is imaged by the photoelectric conversion element in a state where the pixels are thinned out.

9. The imaging element according to claim 6,
wherein in the second reading method, the reading circuit reads out the captured image data from the photoelectric conversion element in a state where the pixels are thinned out.

10. The imaging element according to claim 1,
wherein in the second reading method, the captured image data is a plurality of pieces of thinned image data obtained by thinning out pixels at different locations for each frame,
the memory stores the plurality of pieces of thinned image data, and
the detection circuit detects the motion of the subject based on the plurality of pieces of thinned image data stored in the memory.

11. The imaging element according to claim 1,
wherein the first reading method is used in a case where the motion of the subject is detected by the detection circuit, and the second reading method is used in a case where the motion of the subject is not detected by the detection circuit.

12. The imaging element according to claim 1, further comprising:
the detection circuit.

13. The imaging element according to claim 1,
wherein the imaging element is a laminated imaging element that includes the photoelectric conversion element and in which the photoelectric conversion element is laminated with the memory.

14. An imaging apparatus comprising:
the imaging element according to claim 1; and
a control portion that performs a control for displaying, on a display portion, an image based on the output image data output by the output circuit included in the imaging element.

15. An image data processing method for an imaging element incorporating a reading circuit that reads out, from a photoelectric conversion element, captured image data obtained by imaging a subject by the photoelectric conversion element, a memory that is capable of storing the captured image data read out from the photoelectric conversion element by the reading circuit, and an output circuit that outputs output image data based on the captured image data stored in the memory to an outside of the imaging element, the image data processing method comprising:
outputting the output image data to the outside at a first frame rate by the output circuit included in the imaging element;
reading out the captured image data from the photoelectric conversion element at a second frame rate by the reading circuit;
reading out the captured image data from the photoelectric conversion element using a first reading method or a second reading method having a smaller read data amount than the first reading method by the reading circuit;
in a case of the first reading method, setting the first frame rate to a frame rate corresponding to the second frame rate;
in a case of the second reading method, setting the first frame rate to a frame rate lower than in the case of the first reading method; and
switching between the first reading method and the second reading method in accordance with a detection result of a detection circuit that detects a motion of the subject.

16. A non-transitory computer-readable storage medium storing a program for an imaging element incorporating a reading circuit that reads out, from a photoelectric conversion element, captured image data obtained by imaging a subject by the photoelectric conversion element, a memory that is capable of storing the captured image data read out from the photoelectric conversion element by the reading circuit, and an output circuit that outputs output image data based on the captured image data stored in the memory to an outside of the imaging element, the program for causing a computer to function as the reading circuit and the output circuit,
wherein the output circuit outputs the output image data to the outside at a first frame rate,
the reading circuit reads out the captured image data from the photoelectric conversion element at a second frame rate,
the reading circuit reads out the captured image data from the photoelectric conversion element using a first reading method or a second reading method having a smaller read data amount than the first reading method,
in a case of the first reading method, the first frame rate is a frame rate corresponding to the second frame rate, and in a case of the second reading method, the first frame rate is a frame rate lower than in the case of the first reading method, and
the first reading method and the second reading method are switched in accordance with a detection result of a detection circuit that detects a motion of the subject.

* * * * *